(12) United States Patent
Labaton

(10) Patent No.: US 7,584,886 B2
(45) Date of Patent: Sep. 8, 2009

(54) SECURE AND PORTABLE PAYMENT SYSTEM

(75) Inventor: Isaac J Labaton, Jerusalem (IL)

(73) Assignee: EncoTone, Ltd., Jeruselem (IL)

( * ) Notice: Subject to any disclaimer, the term of this patent is extended or adjusted under 35 U.S.C. 154(b) by 0 days.

(21) Appl. No.: 11/761,915

(22) Filed: Jun. 12, 2007

(65) Prior Publication Data

US 2008/0091596 A1    Apr. 17, 2008

(30) Foreign Application Priority Data

Jun. 12, 2006    (IL) .................... 176262

(51) Int. Cl.
*G07F 19/00*    (2006.01)

(52) U.S. Cl. .................. 235/379; 235/380; 705/18; 705/40; 705/76

(58) Field of Classification Search ........... 235/379, 235/380; 705/18, 40, 76
See application file for complete search history.

(56) References Cited

U.S. PATENT DOCUMENTS

| 2003/0177068 | A1* | 9/2003 | Fujimoto | 705/18 |
| 2004/0044621 | A1* | 3/2004 | Huang et al. | 705/40 |
| 2007/0260558 | A1* | 11/2007 | Look | 705/76 |

OTHER PUBLICATIONS

International Search Report and Written Opinion issued Aug. 18, 2008 in corresponding PCT Application No. PCT/IB07/04226.

* cited by examiner

*Primary Examiner*—Allyson N Trail
(74) *Attorney, Agent, or Firm*—Snell & Wilmer LLP

(57) ABSTRACT

Payment systems are provided that utilize a portable device, and in particular, payment systems that utilize a first portable device that belongs to a seller and a second portable device that belongs to a buyer, but do not utilize a point of sale (POS) device.

1 Claim, 22 Drawing Sheets

FIGURE#2
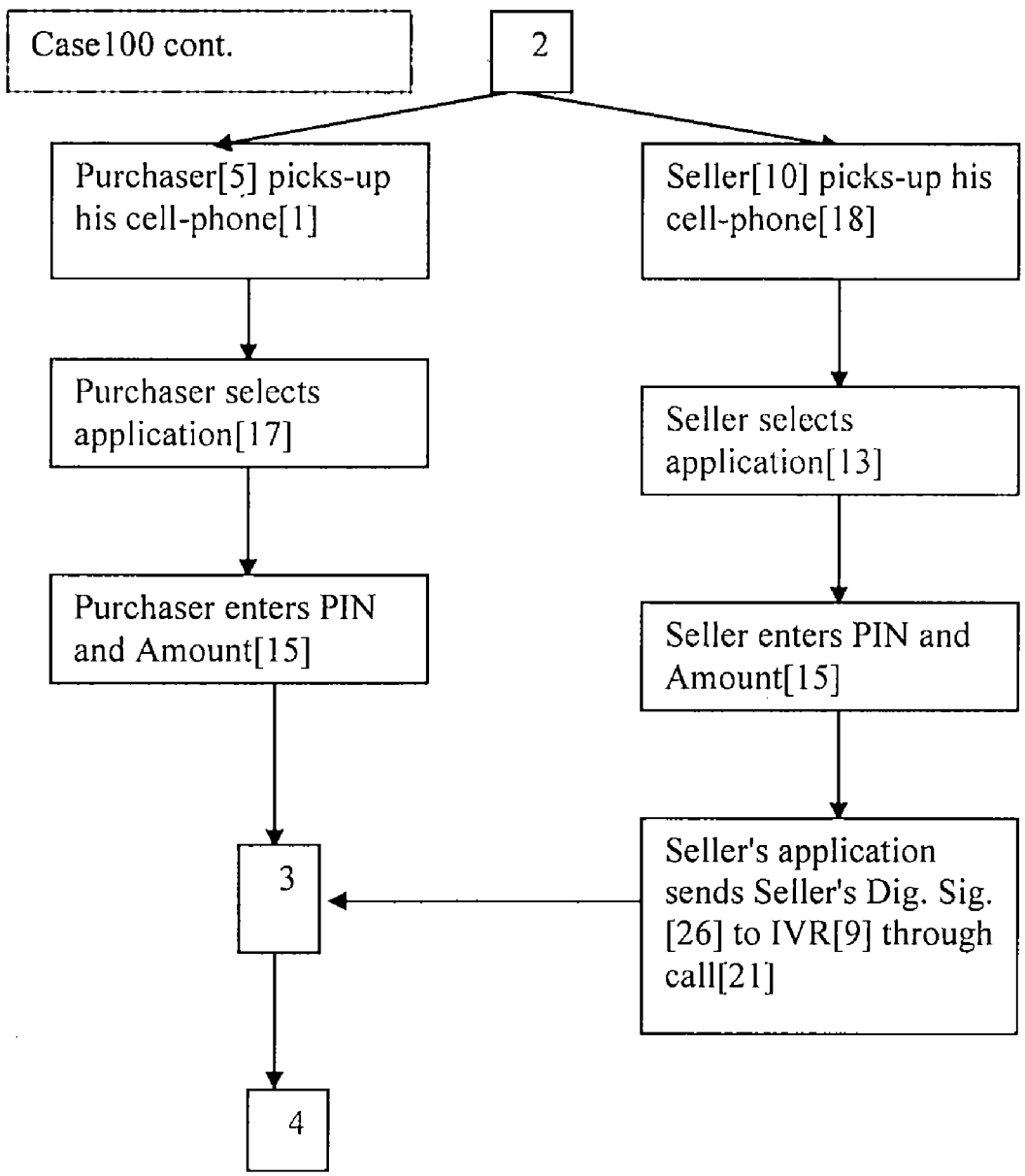

Figure#3
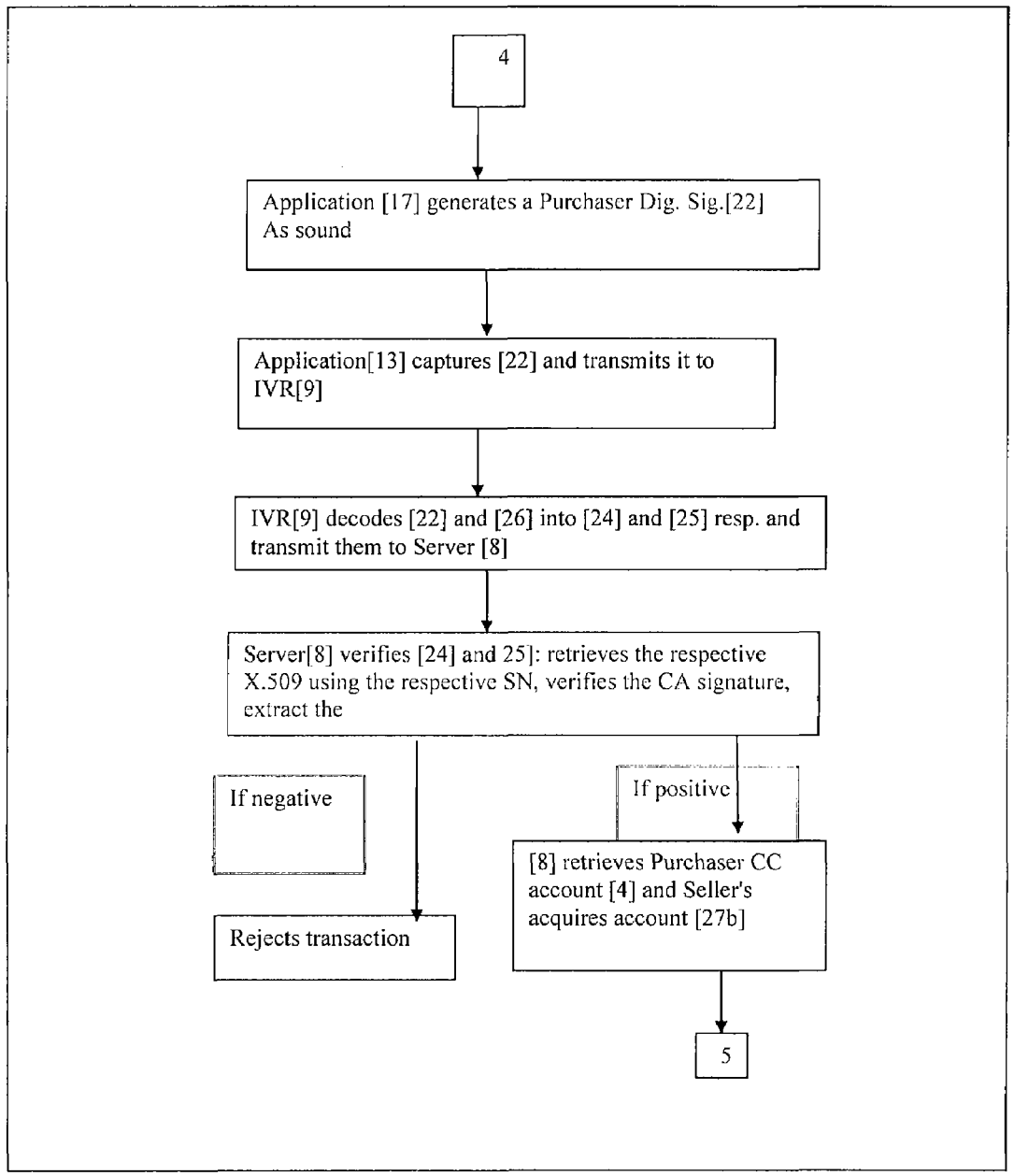

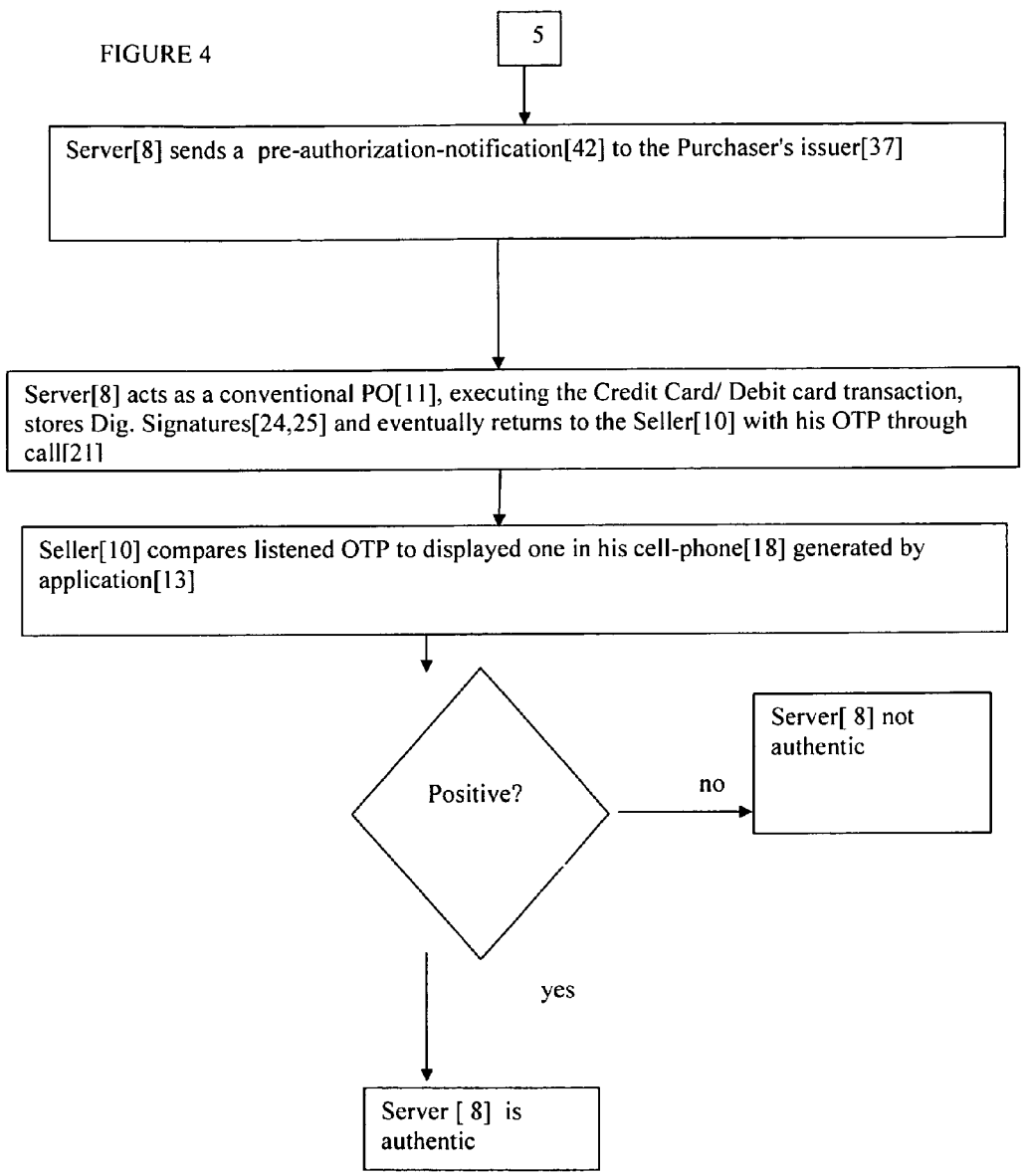

FIGURE#5
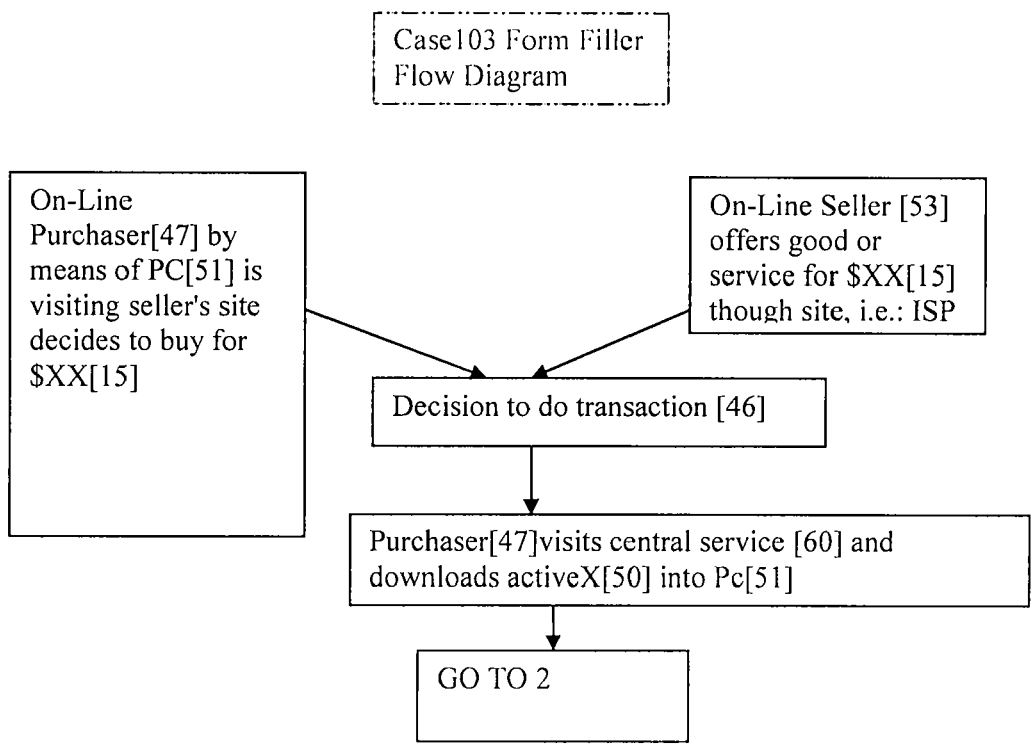

FIGURE#6
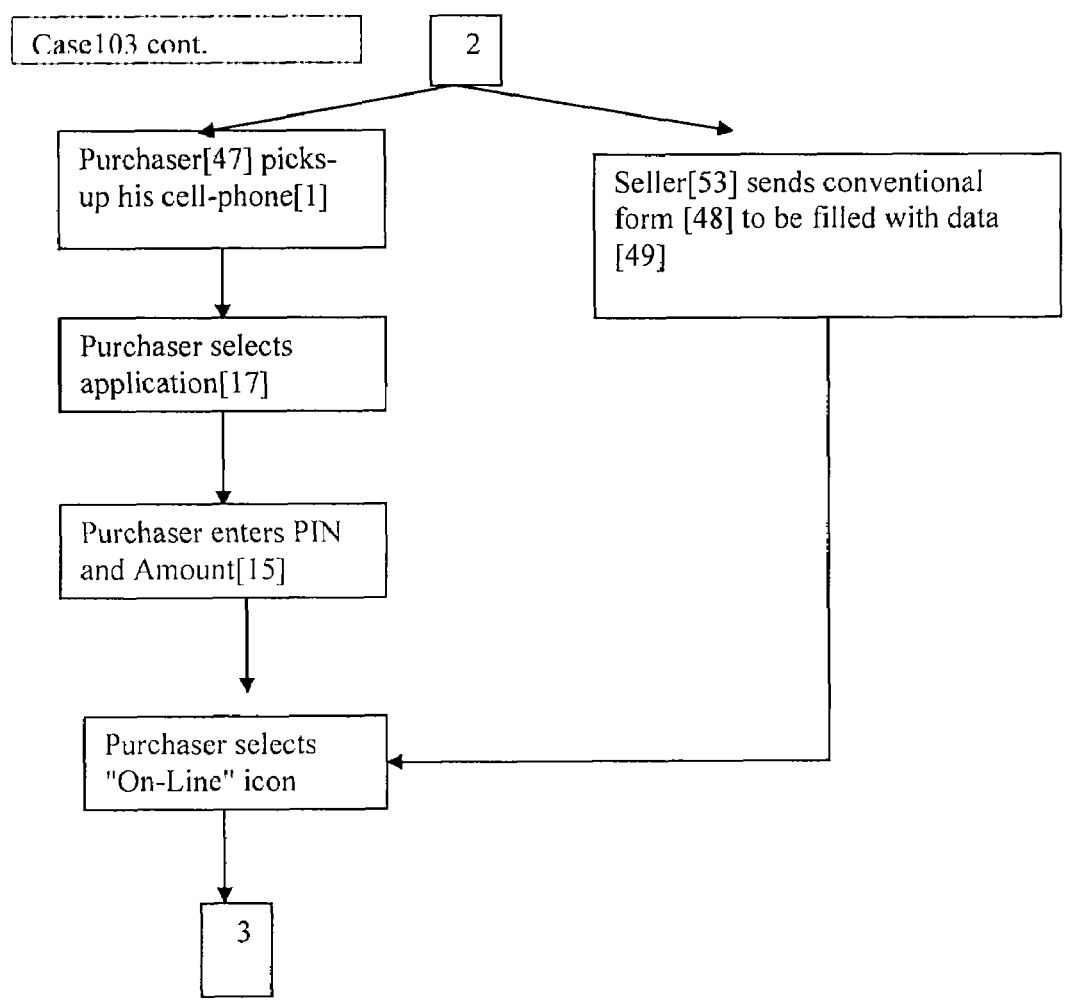

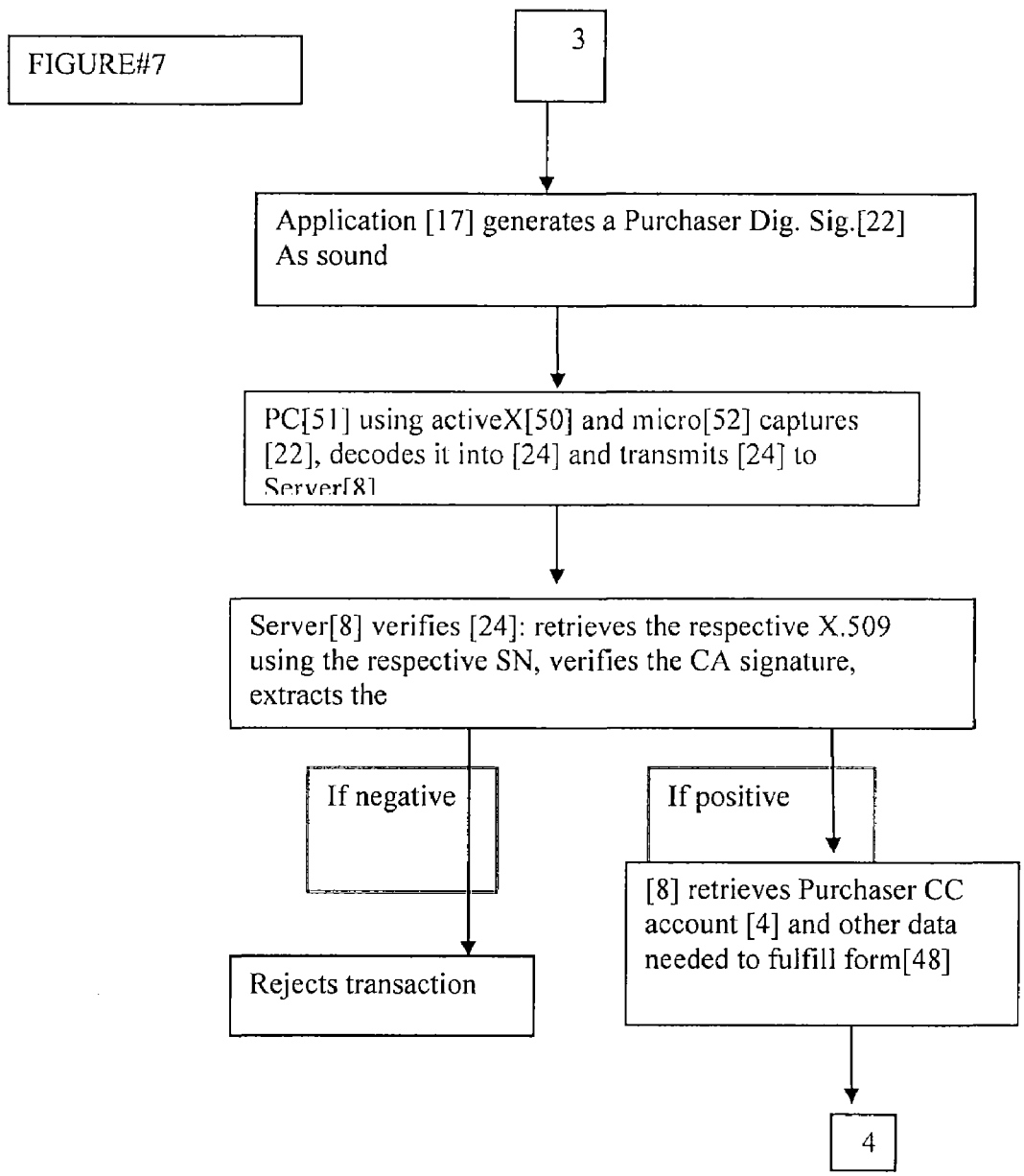

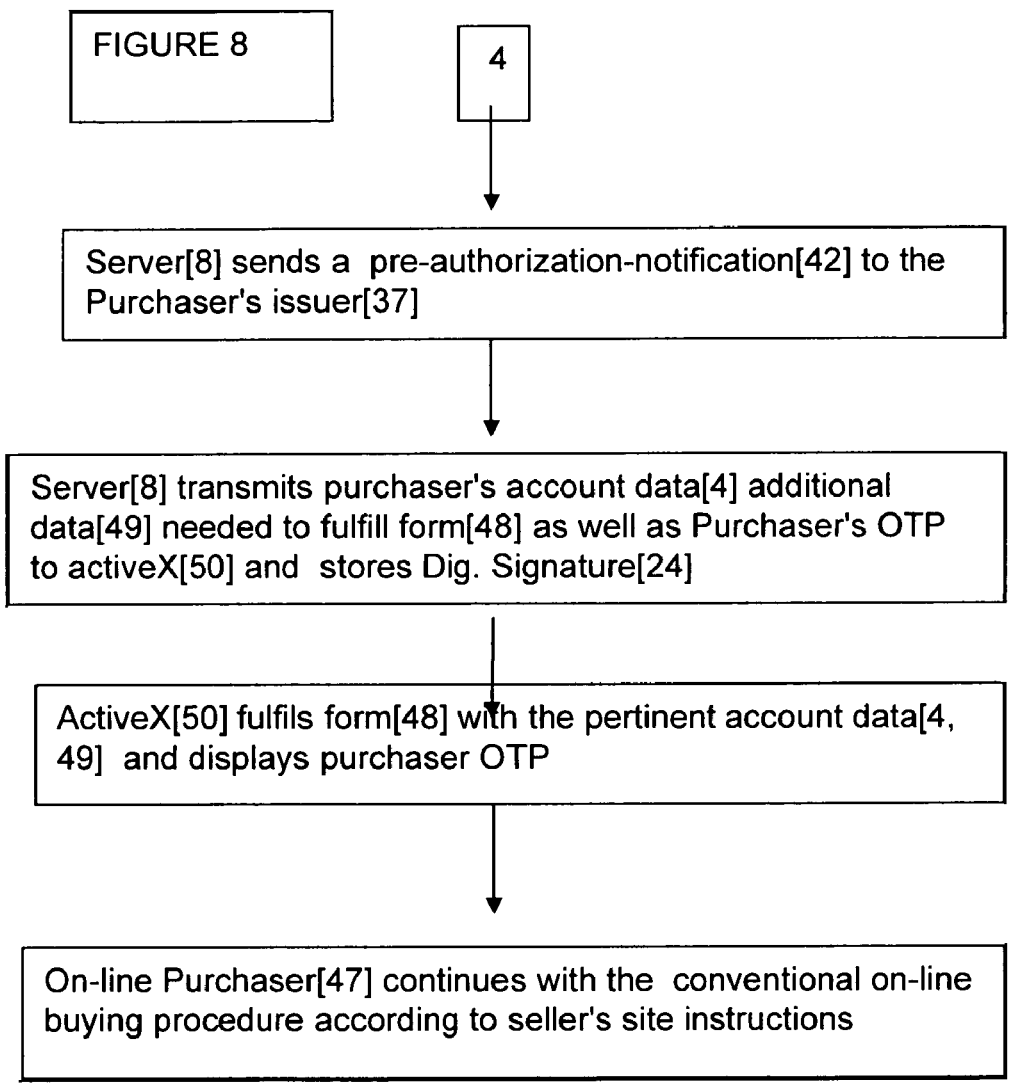

FIGURE#9
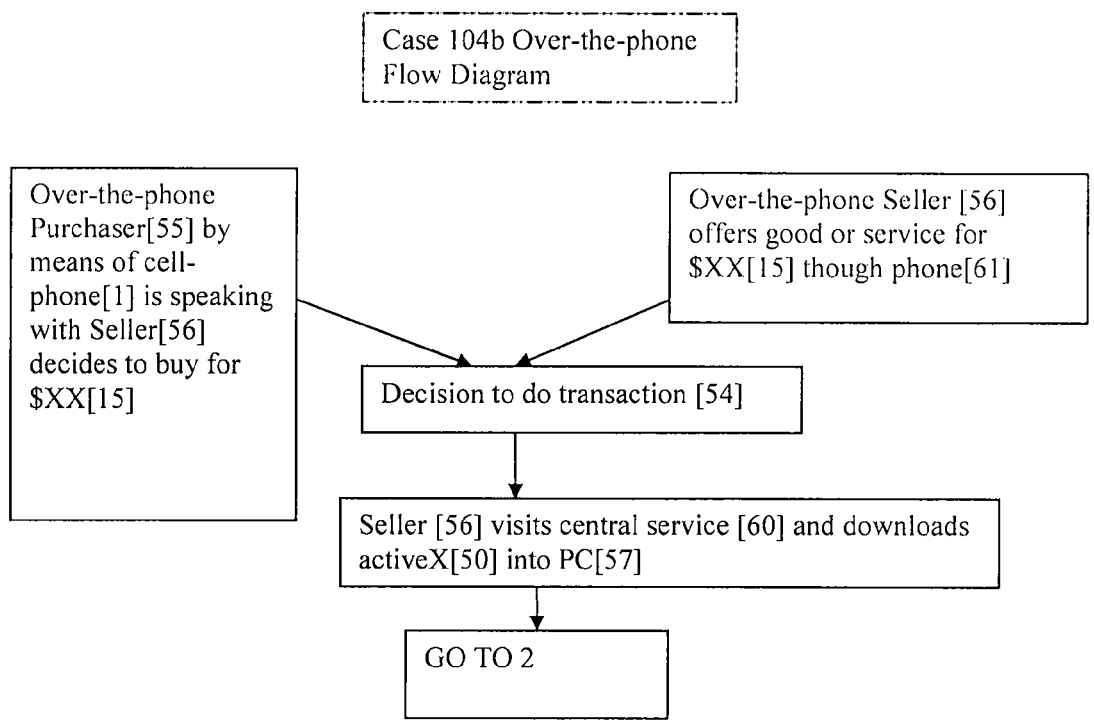

Figure#10
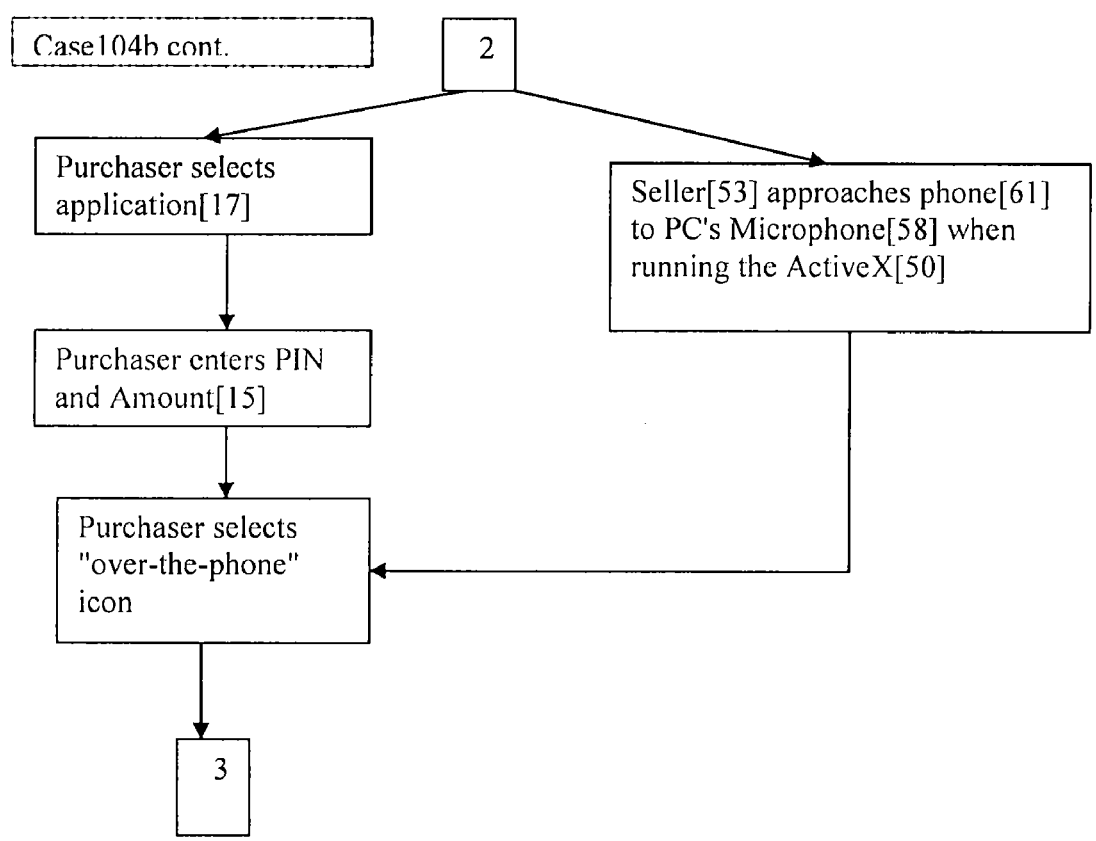

Figure#11
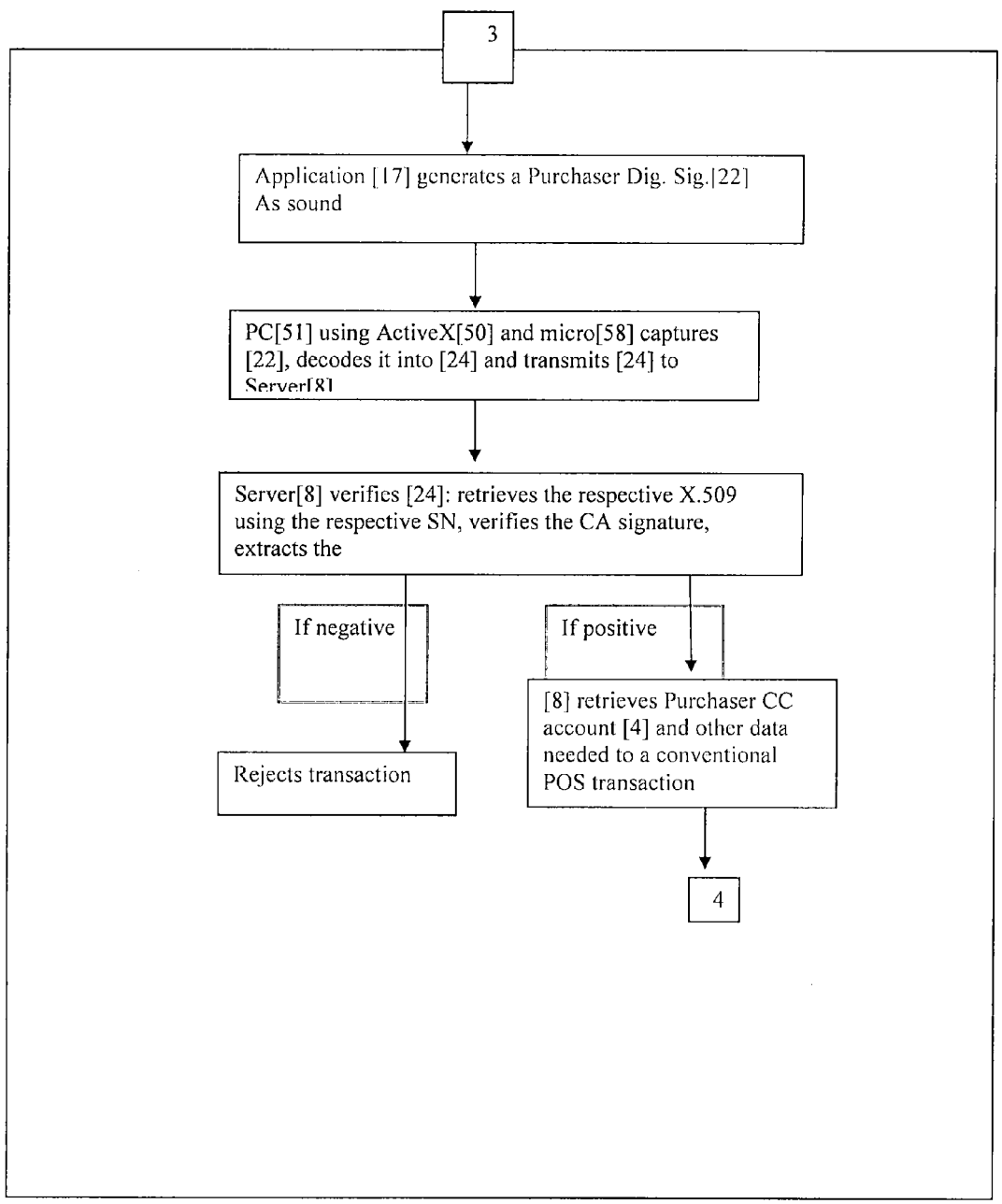

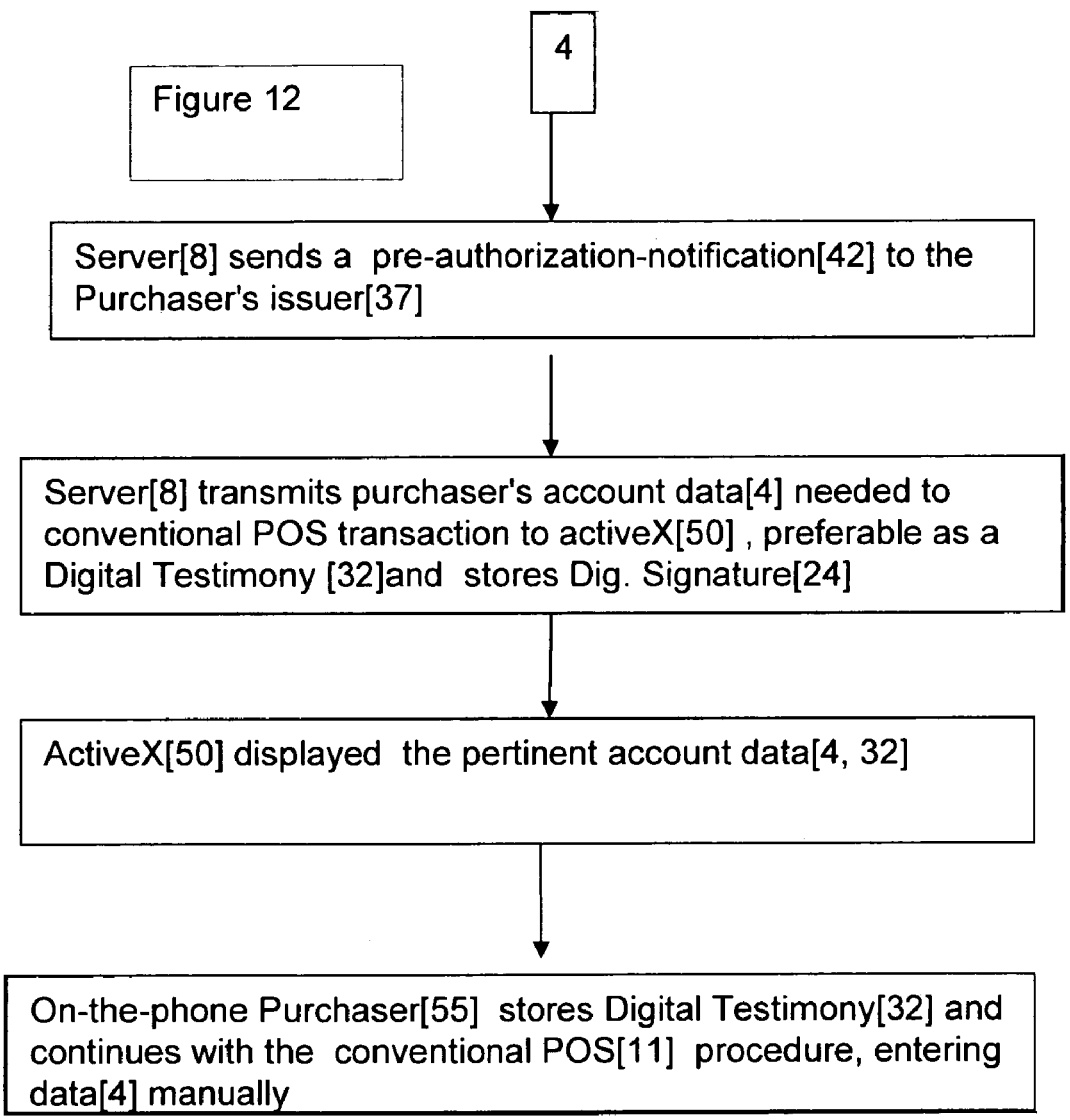

FIGURE#13
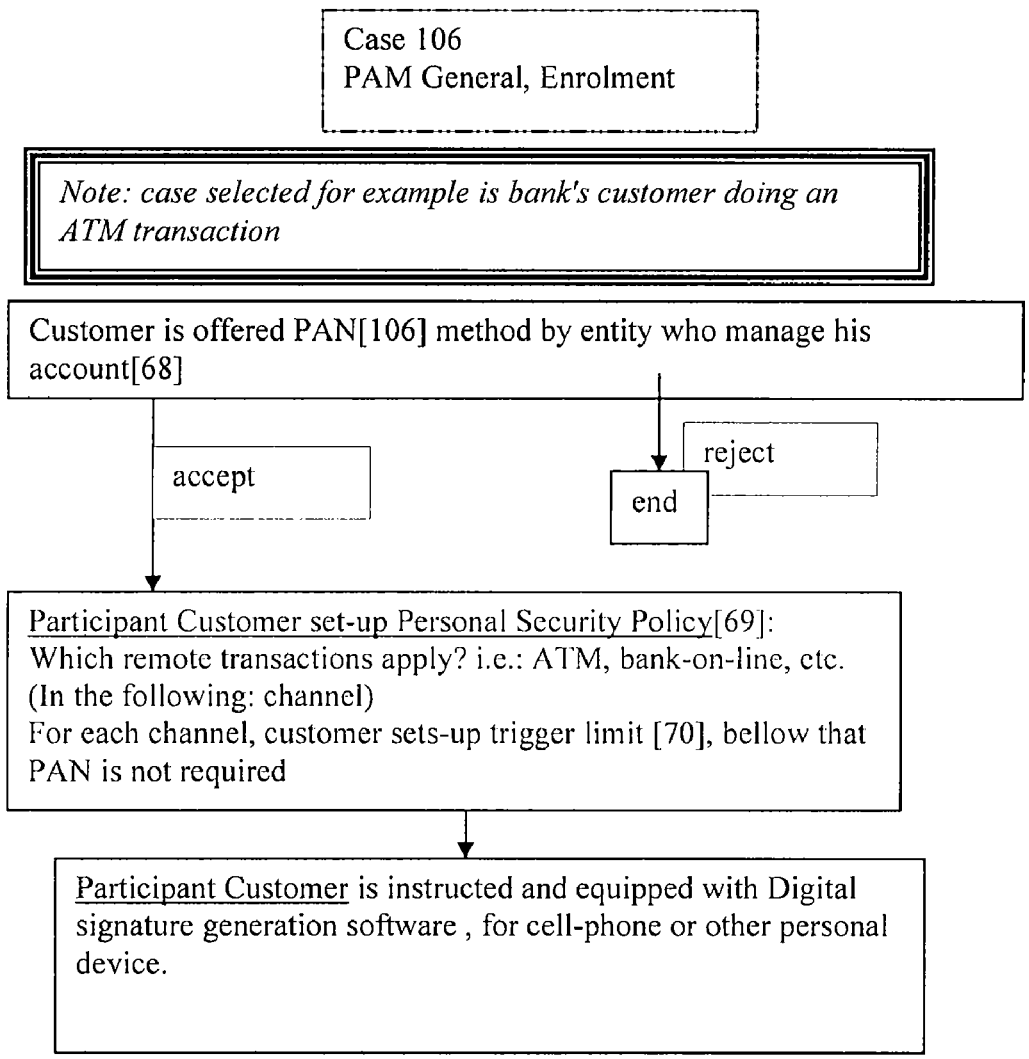

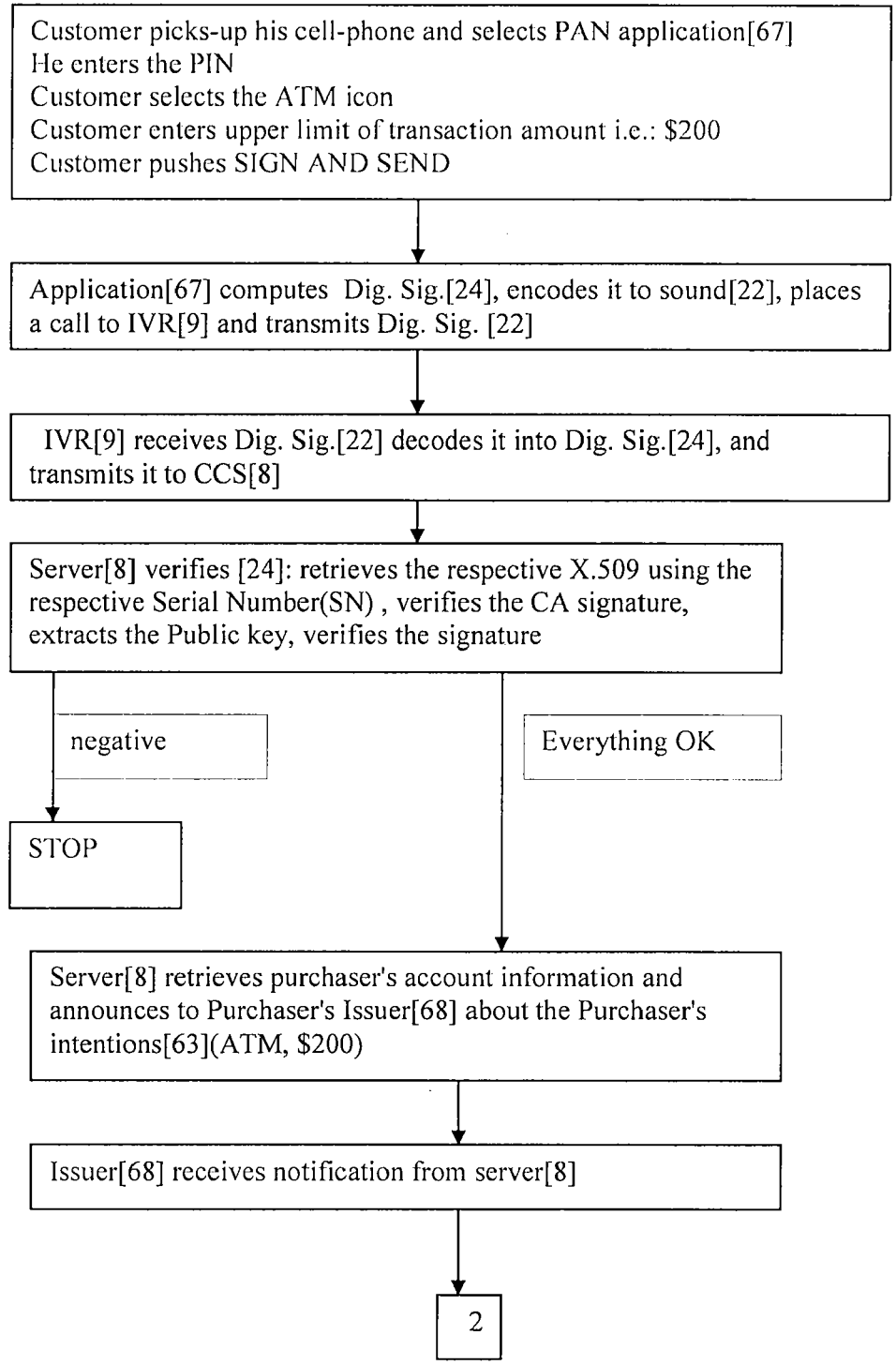
Figure # 14

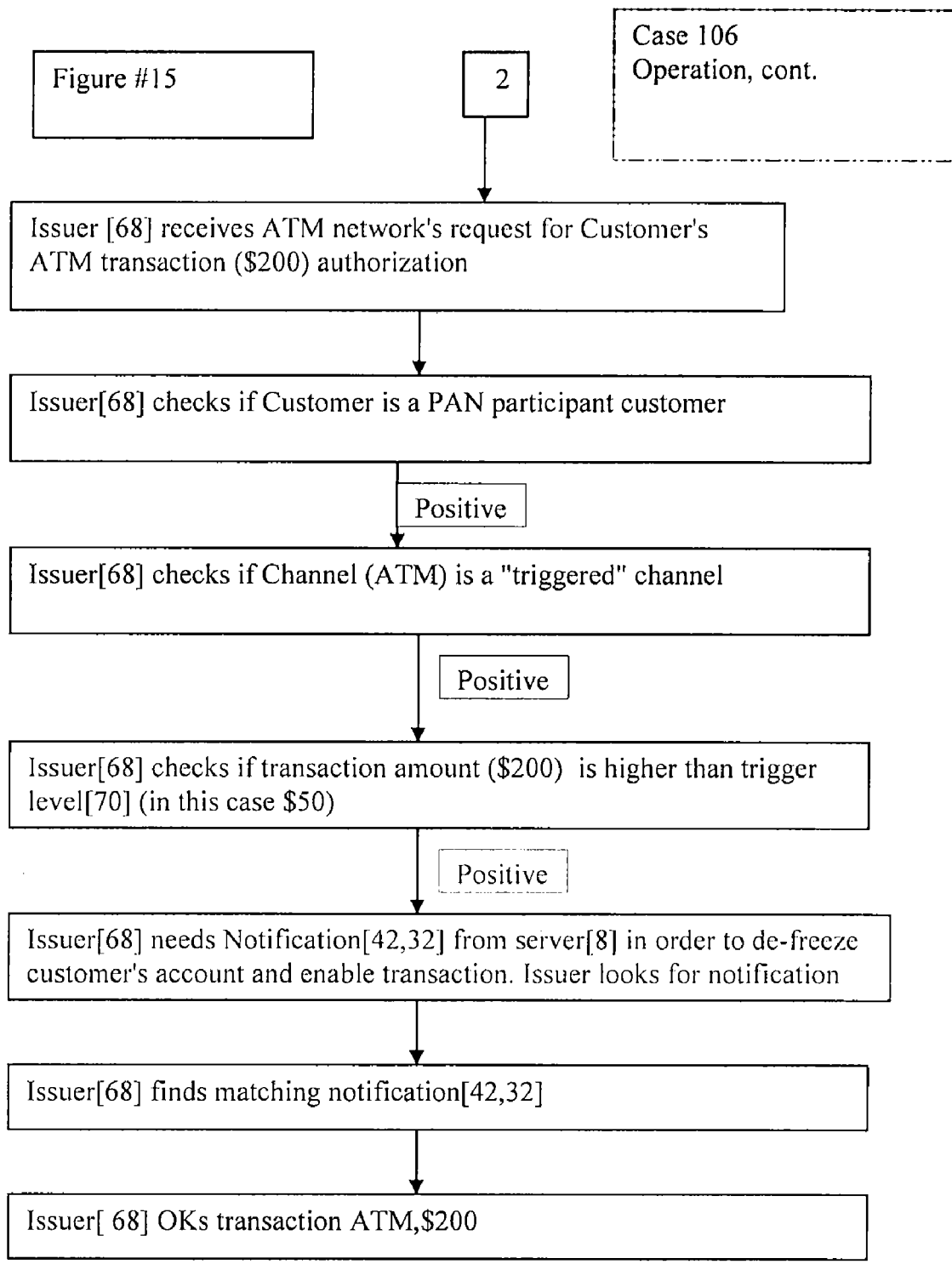

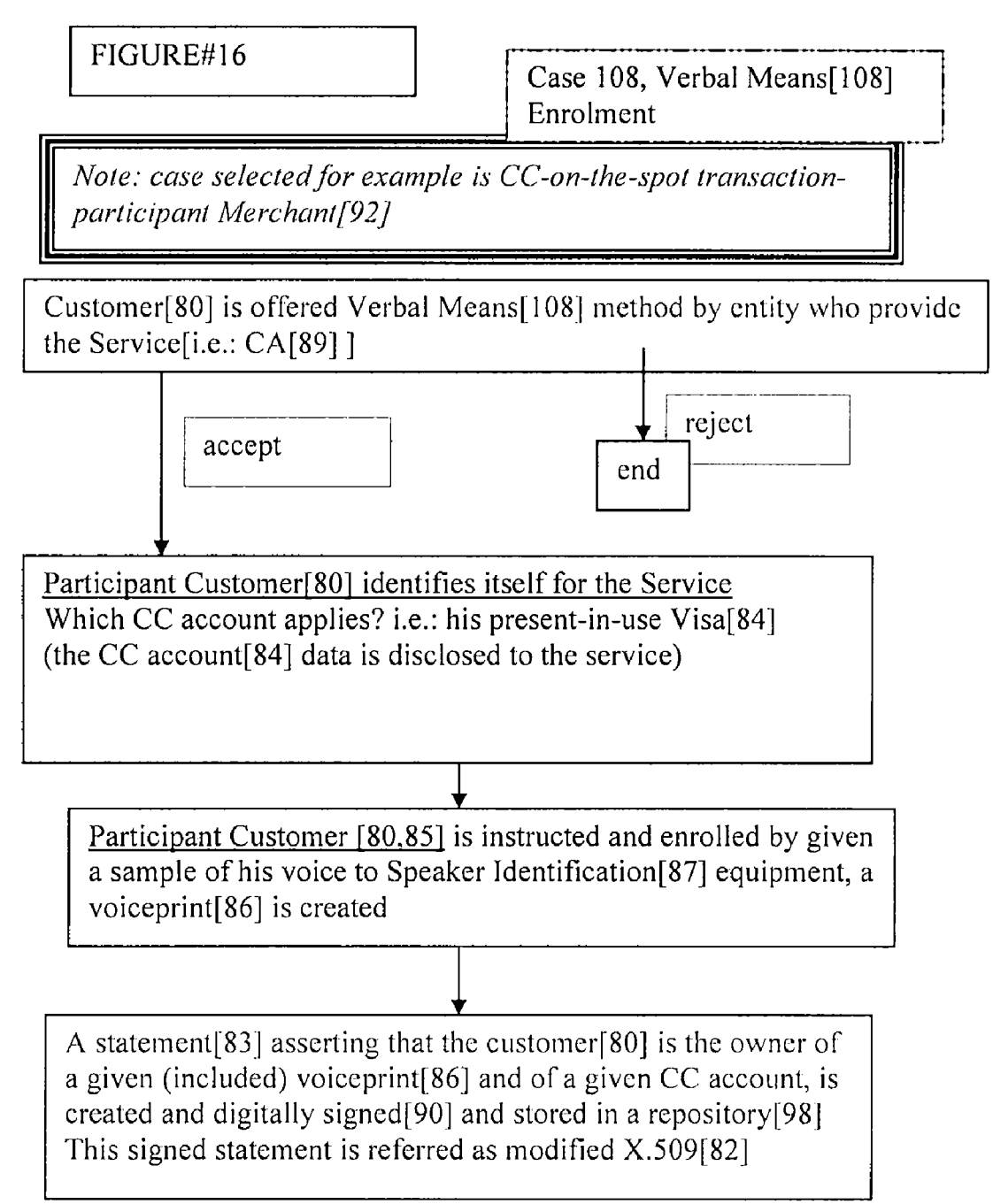

FIGURE#17

Case 108, Verbal Means[108] Operational

*Note: case selected for example is CC-on-the-spot transaction-participant Merchant[92]*

Customer [80] decides to charge his participant account [84] by the amount of $55 and declares to seller that he[80] is a Verbal Means[108] Participant

↓

Participant Customer [80] speaks-up[97] is Identifying info and his willing to do the transaction, amount included and his speech[95] is captured by a Bio-POS[91] microphone

↓

Bio-POS[91] analyzes the speech[95] using Speech recognition technologies[94] and determines the assumed ID, retrieves the respective X.509[82]

↓

Bio-POS[91] analyzes the speech[95] using Speaker Identification[87] equipment creating a voiceprint[96]

↓

Bio-POS[91] compares the signed voiceprint[86] with the computed voiceprint[96]

Dissimilar → end

Similar → 2

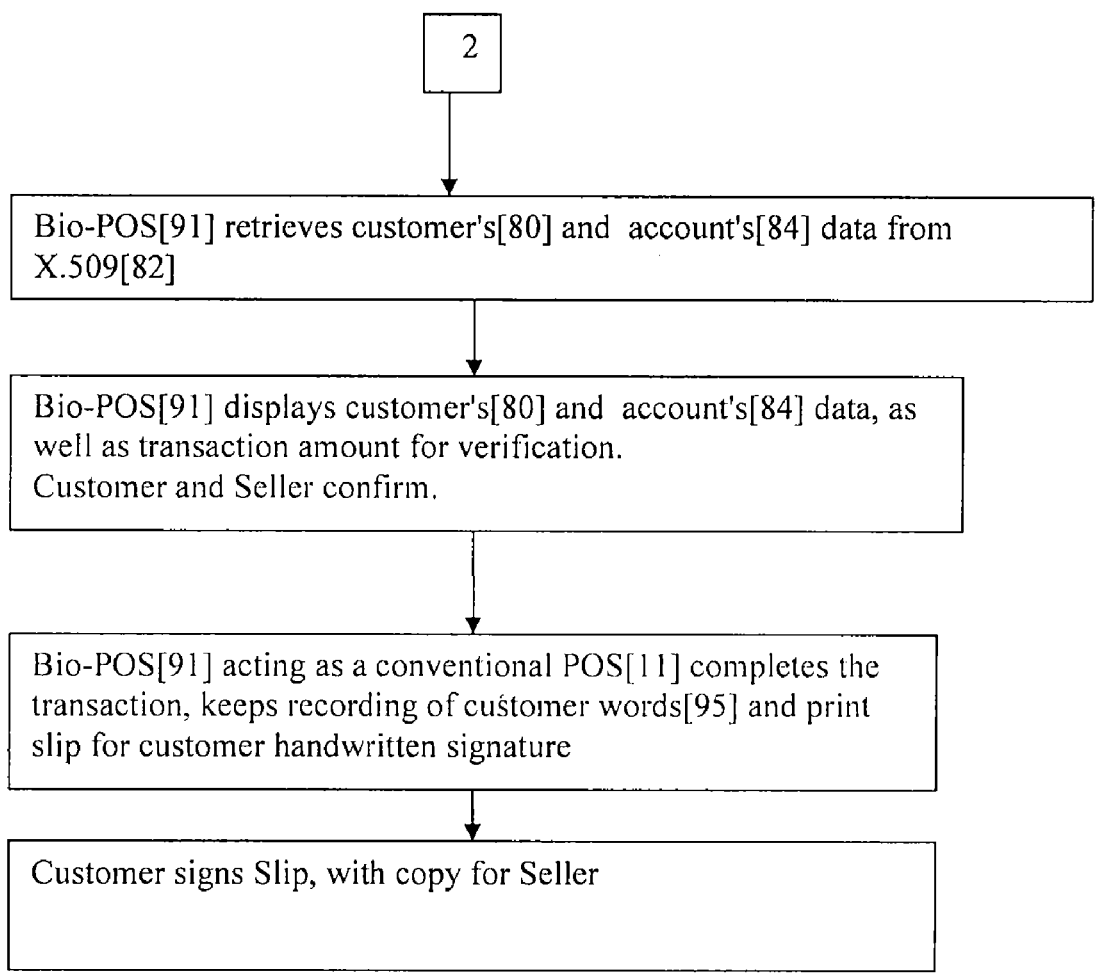

FIGURE 19  Case 102 ADAPTOR[39]
Additional elements as per this invention:
1. Purchaser's Cell-phone application[17]
2. Adaptor[39]
3. Sever software [8]
4. Conventional plastic card with magnetic stripe[41]
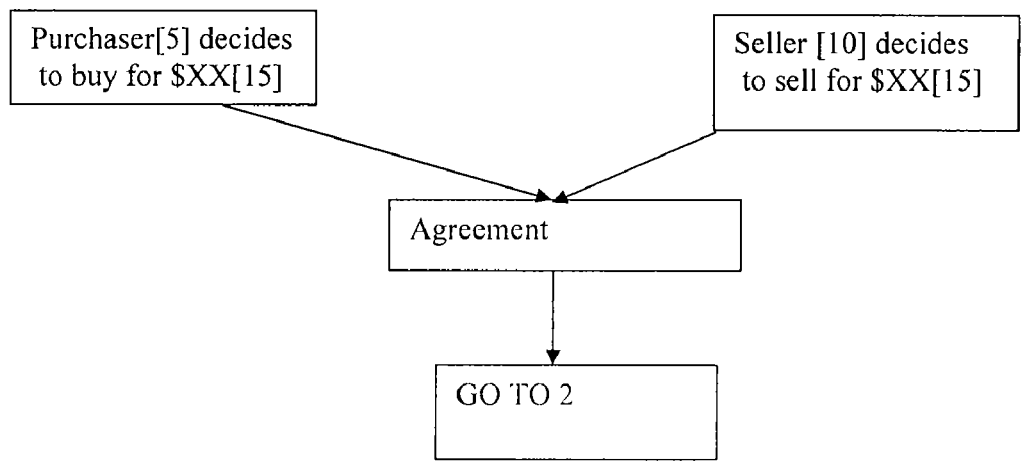
Case 102 adaptor Flow Diagram FIGURE#20
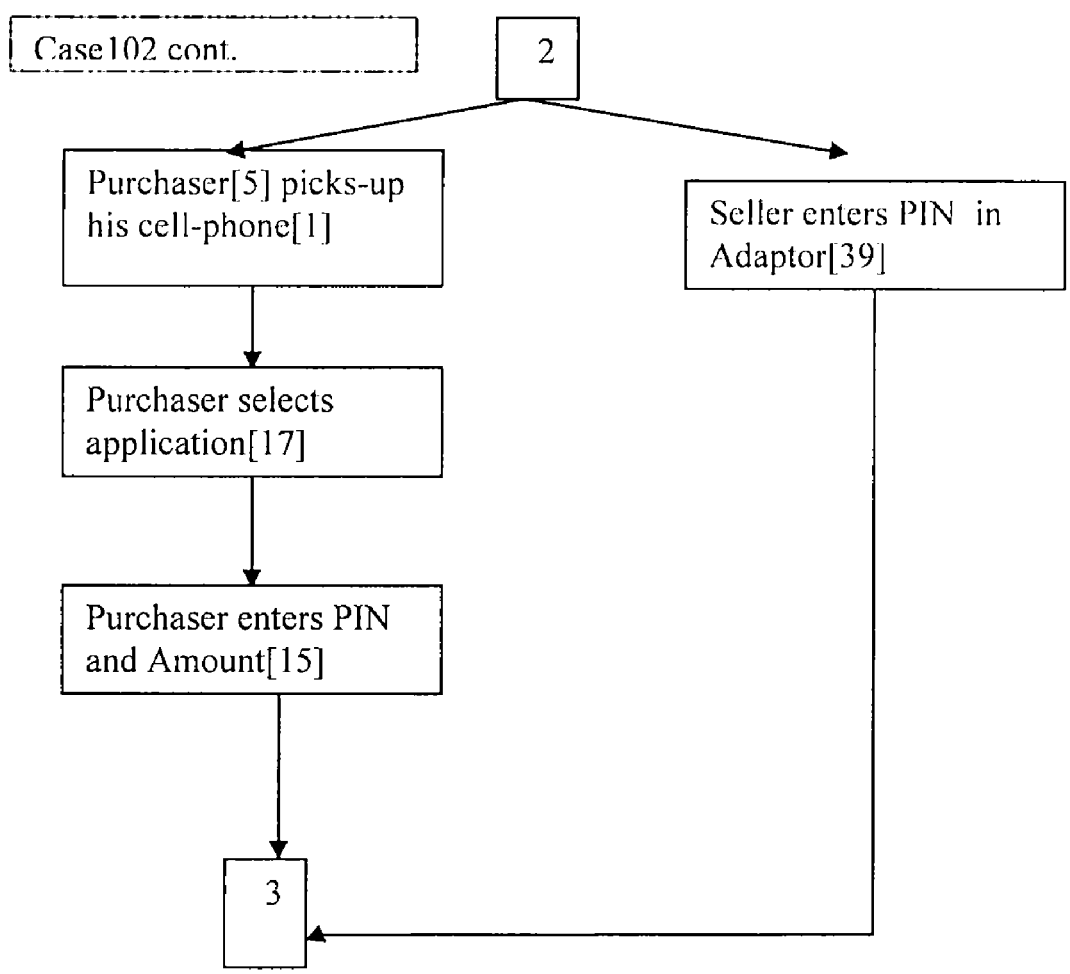

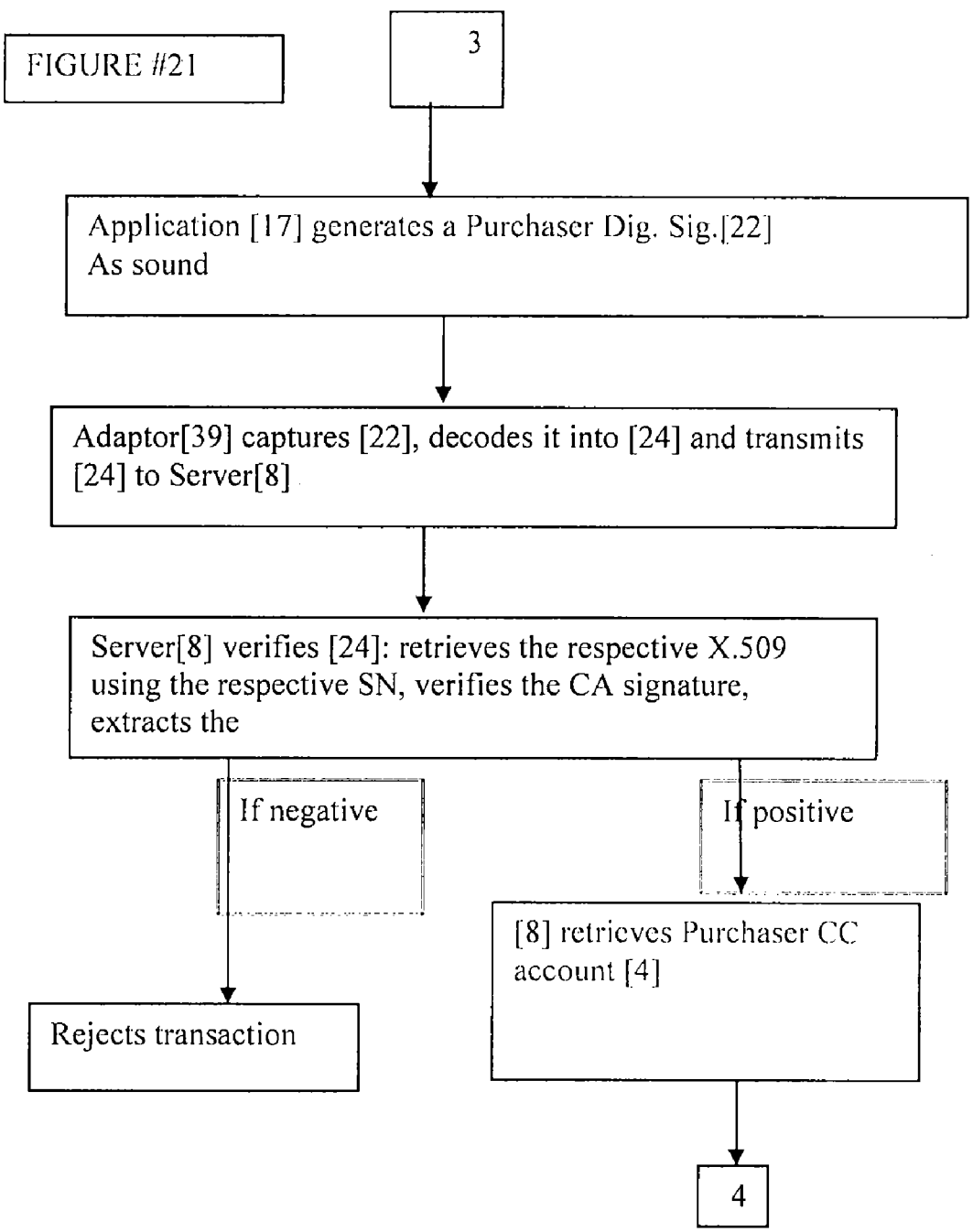

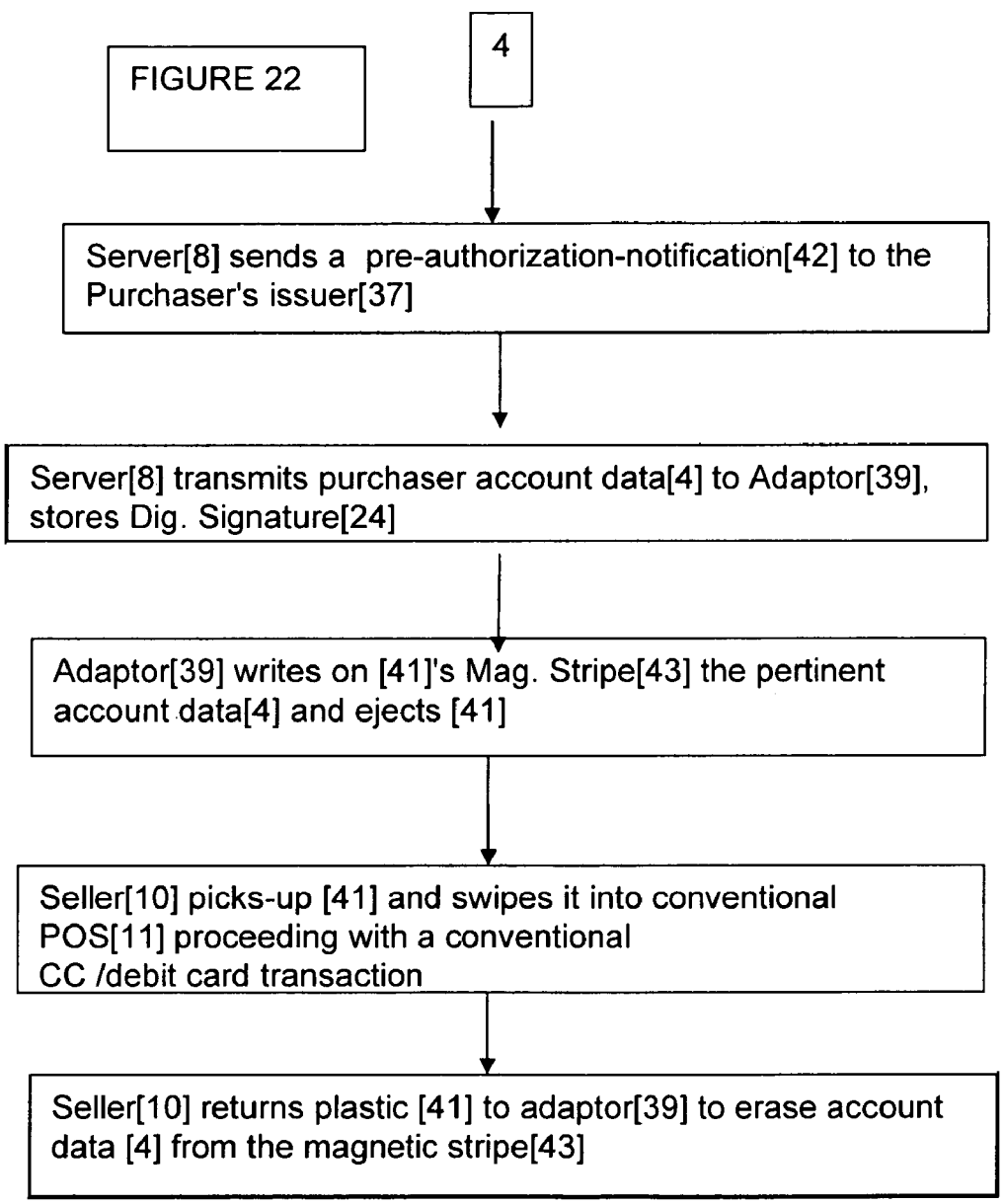

US 7,584,886 B2

SECURE AND PORTABLE PAYMENT SYSTEM

FIELD OF INVENTION

The present invention relates generally to payment systems that utilize a portable device, and in particular to payment systems that utilize a first portable device that belongs to a seller and a second portable device that belongs to a buyer, but do not utilize a point of sale (POS) device.

BACKGROUND OF THE INVENTION

There are a large segment of merchants, such as small business owners, including sellers, traders, servicemen, physicians, lawyers, notaries, insurance people and many others who cannot utilize a credit card system due to the fact they do not have an available point of sale (POS) system at the place where their deals are closed. This problem, a lack of a POS system, is especially significant in countries such as China and India, where the credit card system is not yet developed.

In addition, in more developed countries such as Japan, the credit card system is evolving to utilize the cellular-phone, in the hands of the customer, instead of the conventional plastic card and, consequently to the use of new POS systems with new interfaces, in place of the conventional magnetic stripe reader.

While this kind of evolution can succeed with some businesses, there is a need for a POS-free, credit card company-network-free system that would enable a "one-person" or small business, such as a movable person, with no POS system and no network or electric power, to complete a credit card transaction, a verified credit card transaction on-the-spot, any spot world wide, with a strong security, based on the most advanced security technologies that utilize digital signatures by means of the use of the customer and/or seller cell-phones.

The term cell-phone as used in this application will refer to any handheld or portable device with communications capabilities, and the term credit card or CC will include all financial transaction cards including credit cards, debit cards, smart cards, charge cards, and pre-paid cards.

SUMMARY OF THE INVENTION

In accordance with one embodiment of the present invention, a payment system is provided that will allow a purchaser to use his cell-phone instead of a conventional plastic card with the magnetic stripe, in order to charge his credit or debit account. The payment system, as described in more detail below, in accordance with one embodiment of the present invention includes a central service (CS) server. One configuration of such a server includes features described in U.S. Pat. No. 6,912,659 granted to the applicant of this application.

POS FREE Case:

In accordance with one embodiment of the present invention, a payment system is provided that includes one or more software applications that run in cell-phones, servers and other devices without the use of a POS terminal or other device that reads credit cards, debit cards, smart cards and the like. This embodiment of the present invention may be referred to as POS-Free Payment System.

This payment system enables customers or purchasers, to pay by means of their respective cell-phones or any other personal device carried by the purchasers and by using the services of a central service of this invention.

In accordance with one aspect of the present invention, the cell-phone or other portable device runs a software application. As a result of the use of such cell-phone applications, the purchaser is making payment to a seller by charging the purchaser's credit card or debit card account. As previously stated, it will be appreciated that the term credit card or CC will also refer to debit cards, smart cards, charge cards, and pre-paid cards.

In this case, the seller may not have access to any POS device and may not have any credit card processing network available, may have no electric power, however, the seller has access to his cell-phone, as a sole instrument to complete a secure, verified, and certified CC transaction.

In accordance with this embodiment of the present invention that provides for a POS Free system, when a participant purchaser agrees to enter into a financial transaction with a participant seller and decides to charge his CC account a specific amount to be paid to the seller, he communicates his willing to do so to the seller, and the seller, wherever he will be, picks up his (seller's) cell-phone or other portable device and selects by, pushing the appropriate buttons or selecting the appropriate icons, the seller's application of this invention. In this manner, the seller activates the previously installed application of the present invention for vendors that runs in his cell-phone.

In accordance with one aspect of the present invention, the application may prompt the seller to authenticate himself to the application, for example by entering a personal identification number (PIN), and, in addition, the application will prompt the seller to enter the amount of the transaction. The seller's cell phone may then digitally sign a string including at least the time and date and the transaction's amount and transmit it, for example by placing a call with the cell-phone, to the central service server (CCS). Once the seller fulfill such requisites or in parallel, the purchaser picks up his cell-phone, and selects the purchaser application's icon of this invention and activates it.

The previously installed purchaser's application of the present invention may prompt the cell-phone owner (i.e., the purchaser) to authenticate himself, and to enter the transaction amount the purchaser is willing to charge his CC account in benefit of the seller.

Once the purchaser accomplishes this task, the purchaser places his cell phone near the seller's cell phone. Now, the purchaser cell-phone, by means of the application, generates an acoustic message. One acoustic message system and method to is described in U.S. Pat. No. 6,236,724 granted to the applicant of this patent application. The acoustic message includes a string with the date and time and the amount the purchaser accepted to pay, among other data, both digitally signed with the purchaser's digital signature and encoded to sound. A method to do so is described in GB Patent Number 2,374,182 granted to the applicant of this patent application. The sound carrying the encoded purchaser's digital signature, referred here below also as acoustic message or acoustic digital signature is captured by the seller's cell phone and transmitted to the central service server/interactive voice recognition (IVR) system though the voice channel (same call as before).

The central service server (CCS) complemented with an IVR receives the two encoded digital signatures belonging to the seller and the purchaser respectively. The central service server/IVR decodes the encoded digital signatures into strings of bits (i.e., similar to standard PKCS#7 digital signatures), checks and verifies each of them, and eventually, if both are truthful digital signatures, the central service server identifies the seller and the purchaser by means of their respective X.509 certificate whose respective serial numbers were within the digital signatures, verifies if the transaction amounts are identical and, eventually, the CSS retrieves the purchaser's CC account data, as well as the seller's account data and acting as a POS system, executes the CC transaction, impersonating the seller and the purchaser.

Once the central service server, operating as a POS system receives the transaction confirmation, which is from the CC processing network, it stores the two received digital signatures, returns to the seller uttering a confirmation phrase, including a confirmation number, for the seller to hear and finish the call.

In addition, the CSS can send by e-mail, conventional mail or any other kind of communication system (e.g., SMS), a copy of the transaction confirmation with all the available data, which may be signed, by the CSS.

In this manner, the purchaser has paid to the seller the sum the purchaser decided to pay, charging a credit card account belonging to the purchaser, which may be one associated with a conventional plastic magnetic stripe card or other financial account.

In the case where there is not an associated plastic credit card, the CC account is a kind of virtual CC which is usable only by means of the purchaser's cell-phone application.

Further, as a result of these actions the seller has been credited by the acquirer and/or the CC company the exact sum the seller expected to be credited as if the seller had used a conventional POS and had swiped or otherwise read the customer's credit card.

It will be appreciated that since the only thing the seller needed to use was the application in his cell-phone, the seller enjoys total mobility and does not need to be in his office or his facilities, but the seller can complete a CC transaction in any place all over the world, wherever the seller's cell-phone can work as a phone.

Additionally, it will be appreciated that the transaction completed as per the method, software, devices and servers of the present invention is by far more secure than a conventional magnetic strip card based transaction. This is due to the fact that in accordance with the present invention, there is a digital signature coming from the purchaser, with a time stamp and the amount, stating categorically and undeniably the desire of the purchaser to make a transaction, and charging one particular credit card account of the purchaser.

In accordance with this embodiment of the present invention, the purchaser digital signature completed by using standards such as the PKCS#7, that is usage of the private key of the purchaser, which is known only by the purchaser, and avoiding repudiation, constitutes a digital testimony of the willingness of the purchaser to perform the transaction. Also, the seller digital signature, including the time and date and amount, whereas the amounts should be exactly the same of the purchaser signature, in order to indicate the mutual acceptation of the purchaser and seller to complete the transaction, constitutes a digital testimony against any denial or impersonation claim.

In summary, the procedure for this embodiment of the present invention that includes a POS free system:

The seller selects the application in his cell-phone and enters the PIN and the transaction amount and invites the customer to proceed with the purchaser's cell-phone's CC application (the cell-phone application).

The customer utilizing his cell-phone, selects the purchaser's application, enters the PIN, enters the amount, and places the purchaser's cell-phone near the seller's cell-phone, and presses send or other similar button or icon.

The purchaser's cell-phone application generates a digital signature with the time-stamp and the amount and encodes it to sound (acoustic digital signature).

The seller's cell-phone application captures the acoustic digital signature, places a call to the CSS/IVR, and transmits the purchaser's acoustic digital signature to the CSS/IVR together with the seller's digital signature, and waits for a response.

The IVR captures the acoustic digital signatures, decodes the signatures, and transmits the digital signatures to the CSS (platform server).

The Platform Server:

PS1) receives the customer's and seller's digital signature.

PS2) verifies the digital signatures, compares the amounts, and verifies the time coincidence checking if within tolerances.

PS3) retrieves the sellers account data and the customers account data.

PS4) Notification: The server transmits to the CC company (i.e., the issuer) the transaction data for pre-notification.

PS5) the server acts as a conventional POS system and executes the transaction through conventional networks and if eventually everything is fine, the CC company returns to the server with an authorization number.

PS6) the server stores the customer's and seller's digital signature and returns to the seller with a Confirmation number (optional SMS to customer, e-mail, etc).

Security of the Transaction:

The purchaser's cell-phone application will generate a time stamped digital signature only when the customer enters the correct PIN (or other identification) which is the key for decrypting the private key.

The CC issuer will only authorize the transaction with such CC/debit card when the platform server (CSS) requests authorization after receiving a valid, synchronized digital signature of the authorized user of the CC/debit card.

POS-Free and Seller's Application Free-Case:

In accordance with another embodiment of the present invention, a further variation of the method presented here is a case where the seller does not have the seller's application installed in his cell-phone event though the seller is, indeed, a participant seller, that is, the seller has registered with the CS and has opened a CC acquirer account, an account where he can receive money from the transactions the seller completes.

In accordance with this embodiment of the present invention, everything is as before with the exception that the seller does not sends his digital signature, but, instead the seller identifies themselves against the CSS/IVR using dual-tone multi-frequency (DTMF) tones, and also sending the expected amount that is due for the transaction. The purchaser, who has the purchaser application, sends their acoustic digital signature as before, through the seller's phone, which can be also a regular phone and not necessarily a cellular one.

Conventional POS Case:

So far, the case has been described in which the seller has no POS available and uses a phone or an application previously installed in his cell-phone in order to complete the CC transaction.

In accordance with another embodiment of the present invention, there is the case where the seller does have a conventional POS, and is able to read a conventional credit card with magnetic strip, smart card interface, or other interface such as radio free (RF). In addition, the purchaser may not have a plastic CC for the CC account that the purchaser is willing to charge, but instead has the purchaser's application of the present invention previously installed in the purchaser's cell-phone.

In accordance with this embodiment of the present invention, an adaptor is provided that enables the seller to charge the purchaser's CC account using the seller's conventional POS system, whereas the adaptor is a device that is able to capture the purchaser cell-phone's generated acoustic message carrying the purchaser digital signature encoded to sound.

The adaptor is capable of decoding the captured encoded digital signature, and to transmit the decoded digital signature to the central service server. The central service server receives the digital signature belonging to the purchaser, checks and verifies the digital signature, and eventually, if it is a truthful digital signature, the central service server identifies the purchaser by means of the respective X.509 certificate whose serial numbers are within the digital signature, and, eventually the CSS stores the received digital signature.

Further, the CSS retrieves the purchaser's CC account data, and transmits it back to the adaptor.

Now, the adaptor is in possession of all of the purchaser CC account data that would be stored in a conventional plastic card's magnetic stripe that is necessary to complete a financial transaction. In accordance with this embodiment of the present invention, a clone of a conventional plastic credit card is created that corresponds to the respective purchaser's CC account.

Once the adaptor has written in the plastic card's magnetic strip the received data, the plastic card is extracted from the adaptor and is ready to be used in the seller's conventional POS, as a standard plastic CC.

In accordance with one aspect of the present invention, once used, the "clone" credit card with the purchaser's account data may be returned to the adaptor of the present invention after having been swiped. Doing so, the magnetic stripe's purchaser data will be erased by the adaptor.

Therefore, as a result of use of the adaptor, the seller was able to complete a CC transaction, using the seller's conventional POS device, including the case where the customer has no plastic credit card, but wherein the customer has a cell-phone with the special purchaser's application of the present invention.

In order to better clarify this embodiment of the present invention, a summary of a procedure in accordance with this embodiment:

The seller utilizes an adaptor to enter the transaction amount and invites the customer to proceed with the purchaser's cell-phone application.

The customer picks-up their cell-phone, selects the purchaser's cell-phone application, enters the PIN, enters the amount, and places the cell-phone in proximity to the adaptor's microphone, and presses the send button, or a similar button or icon.

The purchaser's cell-phone application generates a digital signature including the time-stamp and the amount and encodes the digital signature to sound (acoustic digital signature).

The adaptor captures the acoustic digital signature, decodes it, and transmits it to the CSS/IVR together with the seller's data and amount. The adaptor then waits for a response.

The CSS:

PS1) receives the digital signature, and seller's data.

PS2) verifies the digital signature, compares the amounts, and verifies the time coincidence between the digital signature and the seller's data. That is, checks to see if the times are within a tolerance.

PS3) retrieves the seller's account data and the customer's account data.

PS4) optional pre-authorization—the server transmits to the Issuer the transaction data for pre-notification.

PS5) the server stores the customer's and seller's digital signature and returns to the adaptor with the customer's account data.

The adaptor writes on a blank card's magnetic stripe the customer CC/debit card data creating a "clone" card which is ejected from the adaptor, handed by the seller, and swiped in the conventional POS magnetic card reader.

The seller's POS device reads the customer's CC/debit card data and completes the transaction as usual. The "clone" card is returned to adaptor and the magnetic stripe is erased.

Special POS Case:

In accordance with another embodiment of the present invention, a special POS device is provided that is able to capture the acoustic messages generated by the cell-phone purchaser's application of the present invention.

We refer here to a device with all the features and capabilities of a conventional POS device, and in addition, where the special POS device of the present invention is able to work with the cell-phone applications of the present invention.

In accordance with this embodiment of the present invention, the special POS device is configured to capture an acoustic message, using, for example a microphone or similar device, and one or more central processing units (CPUs). This special POS device is able to capture and decode the acoustic message generated by the purchaser cell-phone application of the present invention into a digital string recuperating the purchaser's digital signature. The special POS device is also able to generate a message with the time and date, and the transaction amount, entered by the seller or automatically generated by the seller's system. The special POS device will transmit the message, with the purchaser's and the seller's input, to the central service server, in order to enable the server to proceed as in the above mentioned cases. The CC transaction is completed and a confirmation message is returned to the special POS device, optionally signed by the CSS.

Alternatively, the CSS will verify the purchaser's digital signature, identify the purchaser, retrieve the purchaser's CC data and transmit the relevant data to the special POS device for the completion of the transaction by such special POS device.

In accordance with an aspect of this embodiment, the CSS will store the received digital signatures as digital testimonies of the willingness of the parties to complete the specific transaction.

FORM Filler:

In accordance with another embodiment of the present invention, a solution is provided for on-line purchasing security problems such as identity theft.

A method and software are provided that ease the cumbersome procedures nowadays in use to complete an on-line transaction based on CC or debit cards.

In particular, in most of the conventional cases, the purchaser must fill a form with all the necessary information, in order to enable the on-line transaction.

It is well known by people skilled in the art that a considerable percent of the potential on-line purchasers abandon or drop or discontinue the purchasing procedure precisely during the filling of this form that can be lengthy.

In accordance with this embodiment of the present invention, a method and software for on-line purchasing includes the same purchaser's cell-phone application as in the other cases referred above and, additionally, a software application, that is easy to download into the potential on-line purchaser's personal computer (PC), and, where the installation of such software requires little effort (e.g., similar to the ActiveX Microsoft technology).

This software for on-line purchasing (e.g., ActiveX), once installed in the on-line purchaser's PC, and by using the PC's microphone, is able to capture the acoustic message generated by the cell-phone purchaser's application according to the present invention, that is, the acoustic message carrying the encoded to sound version of the purchaser's digital signature on the date and time and the transaction amount.

The same software of on-line purchaser's PC (ActiveX) has the capability to decode the encoded digital signature and to transmit such digital signature to the CSS, whereas the CSS verifies and checks the received digital signature, and, eventually, if it is a true and accurate digital signature, identifies the purchaser, retrieves the purchaser CC as well as personal data (i.e., address data) from the CSS data base, and sends all the data necessary to fulfill the form to the purchaser's PC application (ActiveX).

Hence, the form is filled automatically and conveniently by the application running in the PC (ActiveX) using XML technology or other similar technology, and the purchaser can send the filled form back to the seller's site to proceed with the on-line operation.

In order to better clarify this case referred to as on-line payments through the internet, a summary of the case's procedure in accordance with an embodiment of the present invention:

The customer visits the sellers web-site, which could be any web-site, not necessarily a participant merchant site, but any on-the-web merchant's site.

The customer, being a participant customer, has a cell-phone with the purchaser's application (a cell-phone with the download application referred to as purchaser's application of the present invention).

The purchaser can use any PC, not necessarily a secure one, nor it is required to pre-install any special software on the PC.

The seller is not required to have special features on the seller's web-site, and the seller may by a non participant merchant.

As in the cases referred above, the CSS will play a role in this procedure as well.

The customer visits the seller's site with any PC and decides to buy. The buyer receives a form to fill that may be extensive, and that requires Credit/Debit card data, address, and the like.

The customer browses to the CSS site and downloads an ActiveX (Form Filler ActiveX) application The customer picks up his cell-phone and selects the purchaser's application, enters the PIN, enters the amount, and presses SEND (or similar button or icon) when the customer's cell-phone is placed near the PC microphone.

The purchaser's application computes a digital signature over the time-stamp and the amount and encodes it to sound (acoustic digital signature).

The ActiveX captures the acoustic signature, decodes it, and transmits it to the CSS.

The CSS:

1) Receives the customer's digital signature, 2) verifies the digital signature, and verifies the time coincidence, i.e.: if within tolerance, 3) retrieves the customers account data, 4) optional pre-notification: The Server transmits to the CC Issuer the transaction data for notification of the willingness of the customer to perform a transaction such as this with his CC, 5) The server stores the customer's digital signature and returns to the customer's PC application with the necessary data to fulfill the form.

The ActiveX PC application receives the data, and fulfills the form.

The customer presses "pay" or similar button/icon on the already fulfilled seller's form and the transaction proceeds as a standard transaction for the seller.

Case Over-the-Phone Transactions:

In accordance with another embodiment of the present invention, the customer is willing to make an over-the-phone transaction using the cell-phone purchaser's application of the present invention.

The phone merchant is a participant merchant and has an on-line PC equipped with a microphone. The seller is not necessarily equipped with a POS device and while the seller will use a PC, this PC does not need to have any special application previously installed. Also, the seller does not need any special features in his cell-phone and can receive calls in any phone.

As in all the cases above, the CSS plays a role as a service.

Thus, there will be a CSS connected with the CC company network, and the connection between the seller's PC and the server will be the internet or other network.

Case Procedure.

The customer picks-up the customer's cell-phone, calls the seller's number and at the due time decides to buy a good or service (i.e., shares).

The seller using the seller's PC goes to CSS's site, enters the seller's login name and PIN and the transaction amount and invites the customer to proceed with their purchaser's cell-phone application.

The customer selects the purchaser's cell-phone application, enters the PIN, enters the amount, and presses "SEND by phone".

The purchaser cell-phone application generates a digital signature over the time-stamp and the amount and encodes it to sound (acoustic digital signature) and sends it through the voice channel.

The seller places the seller's cell-phone proximate to the PC's microphone.

The PC captures the acoustic digital signature sent by the customer, decodes it, and transmits it to the platform's server.

The Platform's Server:

PS1) receives the customer's digital signature and seller's imputed data.

PS2) verifies the digital signature, compares the amounts, and verifies the time coincidence (checks to see if between tolerances).

PS3) retrieves the seller's account data and the customer's account data.

PS4) The server, acting as a POS device, transmits to the CC company network the transaction data for approval, and if everything is fine, the CC company returns to the server with a confirmation number.

PS5) the server stores the customer's digital signature and seller's data and returns to the seller's PC with a confirmation number or digital testimony signed by the server, a document stating the reception of valid customer's digital signature, signed by the CSS itself (optionally, the CSS may send an SMS, e-mail, or the like to the customer).

Pre-Authorization Notification.

In accordance with another embodiment of the present invention, a method is provided to pre-announce to the purchaser's CC issuer or, alternatively, to the purchaser's bank, or, in general, to the entity which manages the purchaser's account, the intention of the true account's owner to complete a specific transaction. Stated another way, the true and authorized account's owner has identified themselves by way of his/her digital signature stamped on the time and date as well as the amount, type of the transaction, and has let the CSS server know of the account owner's willingness to complete a transaction in all the cases mentioned above. Now, the CSS can inform or notify the purchaser's CC issuer or, alternatively, the purchaser's bank, or the entity that manages the purchaser's account about the intention of the true account's owner to complete a transaction.

Referring now to the security aspects, it should be appreciated that the purchaser's application will generate a time stamped digital signature only when the customer enters the correct PIN, known only by the authorized owner of the CC account. This secret PIN is not stored in the cell-phone memory, and it is the key for decrypting the private key according to the procedure and method described in the Israeli patent application 173463 applied by the applicant of this patent application.

It is optional that the CC Issuer or account manager will only enable transactions with a credit card/debit card, if they have received a signed-by-the-CSS notification of the authorization of the account owner to do a transaction that is not higher than the amount digitally signed, within a certain period of time (e.g., up to 10 minutes of the digitally signed time stamp).

Therefore, the CSS will notify the Issuer about the account owner's authorization only after receiving a valid, time stamped digital signature of the authorized owner including the amount. Due to the fact that this digital signature based authorization notification reaches the CC Issuer before or simultaneously with the conventional transaction approval request, this notification is referred to as Pre-Authorization or Pre-Authorization Notification (PAN).

It should be appreciated that the PAN is a valid option for all the cases presented here, and greatly increases the security of the use of CC for any transaction, on-the-spot, over-the-net, as well as over-the-phone, and in general, any transaction where the account manager; that is, the Issuer, the bank, and the like, do not see the account owner.

As it is well known, the lack of compelling identification of the transactor, (i.e., the person that intends to buy with the CC), by the only entity (i.e., Issuer, bank) that positively knows the account's owner is one of the most enabling factors that facilitates identity theft.

Therefore, due to the fact that the PAN's request is previous or simultaneous to notification by the CSS (digitally signed) to the account manager (issuer or bank) of the willingness of the account owner, positively identified by the CSS using the X.509 certificate, to accomplish a transaction with an upper limit amount, within a certain period of time, and the validity of this willingness is supported and corroborated by the account owner's digital signature, as a digital testimony of the account owner's desire, identity theft will not be feasible.

Consequently, requesting the PAN for some or all transactions with a particular account, will strongly increase the security of such account.

And this strengthened security is valid for any case of remote transactions, where the entity that knows the account owner, usually the bank itself who manage such account, enables remote transactions. As used here, the term remote transactions means any transaction accomplished without the bank employee's personal verification of the identification of the account owner, for example, such as an automatic teller machine (ATM) transaction, a phone-banking transaction, an on-line banking transaction, a check based transaction, a fax based transaction, any CC based transaction, on-the-spot, e-commerce, over-the-phone or automatic dispenser and in general, any transaction affecting money in an account wherein the identity of the transactor, that is, the question if the transactor is the authorized person to take money from the account or is an impostor, cannot be checked by a bank employee.

For these cases, the PAN provides to a clear-cut security solution due to the fact that the account manager may freeze the account and reject any of such transaction attempts, of the type named above, if the account manager does not have the notification of the CSS about the perfectly secure and non-repudiable identification of the account owner based in digital signature technologies. In addition, not only identification, but also corroboration, within the notification, about the willingness of the account owner to accomplish at a certain time (e.g., within five minutes of the time-stamp), such type of transaction (e.g., ATM) with an upper limit (e.g., up to US$150).

In accordance with another embodiment of the present invention, a method is provided of securing a remote transaction without disruption of the present in use procedure to accomplish such remote transaction.

Reference is made to remote transactions wherein there is an entity who manages a customer's account, like a bank, and wherein the account owner provides instructions to such account manager to pay or withdraw money from such account from a remote location respecting to the account manager.

In order to clarify this case, an example is the remote conventional transaction represented by the use of an ATM machine by a bank (account manager) customer in order to extract money.

As stated above, the method presented here is not disruptive, that is, it will not change anything substantial in the way to accomplish the given remote transaction, but will add to the present-in-use procedure a pre-authorization notification step (PAN step).

Therefore, for this particular ATM case, the procedure is summarized as follows: before the customer accomplishes the withdrawing of the money from the ATM machine as usual, the customer picks-up his cell-phone and selects the PAN application, which was previously installed in his cell-phone. Once activated the PAN application will offer a menu of possible remote transactions.

For this case, the customer selects the ATM icon.

The application will ask the customer to enter the upper limit of the transaction's amount (e.g., US$100). Once entered, the application will compute a time stamped digital signature over the amount and the type of transaction—in this case, ATM. The application will also encode the digital signature to sound and will place a call to the IVR system working in conjunction with a server. The server, which may be located at the account manager facilities, will receive the digital signature, and will check the validity of such digital signature. If the digital signature is valid, the server will prepare a digitally-signed-by-the-server document stating the verified-by-the-server customer's willingness to accomplish an ATM transaction up to the upper limit within a certain period of time. This digitally-signed-by-the-server document may be referred to as a digital testimony. Now, the server will transmit the digital testimony to the account manager (i.e., the customer's bank mainframe, the CC issuer platform, and the like).

The customer proceeds with the remote transaction as usual, in this case, the customer enters their plastic CC in the ATM, enters their PIN, and other information, exactly as the procedure is today.

This procedure includes the transaction's request for approval that the ATM transmits to the account manager system. Once such transaction's request for approval reaches the account manager system, the account manager system will proceed as today plus certain additional steps due to the method of the present invention. These additional steps include checking if the customer who intends to complete the transaction is a PAN's participant customer and if positive, the checking is for the type of transaction, in this case ATM, and for an upper limit that the customer has instructed the account manager. The corroboration is that the account manager system has the pre-authorization notification in the form of a digital testimony, or alike, notifying the account management of the customer's willingness to pursue with such transaction.

In the negative case, that is, if the account management system does not have the expected digital testimony, the account management system is expected to reject the transaction and/or to suspend the progress of the transaction approval and/or to contact the customer for verification.

While the above mentioned example refers to ATM remote transaction, the PAN method is also useful for other types of remote transactions such as check based transactions, fax based transactions, banking through the internet, banking over-the-phone, CC or debit card based transactions, and in general all the related account transactions wherein the customer identity and willingness cannot be verified by the account manager staff. Stated-another way, it is as if the "faucet" (the account) is always closed, with the exception of the certain window of time after the account manager receives the notification to open it for one particular type of transaction and up to one particular limited amount. And where such notification is based in a customer well verified digital signature.

Now, with reference to the example of a CC based on-line transaction whereas the on-line merchant is a non-participant on-line merchant. That is, a merchant that does not know about the existence of the PAN method.

In this case, the customer will buy at such a merchant as today, with no procedure change but before completing the transaction, if the type and amount of the transaction falls within the category of restricted transactions as per the agreement between the customer and the account manager, then the customer will add to the present-in-use procedure a pre-authorization notification step (PAN step). Therefore, the procedure is summarized as follows: before the customer accomplishes the transaction as usual, the customer picks up their cell-phone and selects the PAN application, that was previously installed in the customer's cell-phone. Once activated the PAN application will offer a menu of possible remote transactions.

For this case, the customer selects the "CC on-line" or similar icon/button.

The application will prompt the customer to enter the upper limit of the transaction's amount (e.g., US$150). Once entered, the application will compute a time stamped digital signature over the amount and the type of transaction, CC on-line in this case. The application will place a call to the IVR system working in conjunction with a server and will also encode the digital signature to sound. The server, which may be located at the account manager (i.e., the CC or Debit card Issuer) facilities, will receive the digital signature, will check the validity of such digital signature, and, if everything is valid, will prepare a digitally-signed-by-the-server document stating the verified-by-the-server customer's willingness to accomplish an CC transaction up to the upper, limit within a certain period of time. This digitally-signed-by-the-server document is referred to as a digital testimony. Now, the server will transmit the digital testimony to the account manager (the customer's bank mainframe, the CC issuer platform, and the like).

The customer proceeds with the remote transaction as usual.

This procedure includes the transaction's request for approval that the merchant POS device transmits to the account manager system through the CC company network. Once the transaction's request for approval reaches the account manager system (i.e., the bank, the CC Issuer), the account manager system will proceed as today plus certain additional steps due to the method of the present invention.

These additional steps include checking if the customer's account, the account relevant for the transaction, is a PAN's participant customer account and, if positive, checking for the type of transaction, in this case CC on-line and for the upper limit that the customer has instructed the account manager. That is, the required corroboration that the account manager system has in his possession the respective pre-authorization notification in the form of a digital testimony, or similar notification, notifying the account management of the customer's willingness to pursue with such transaction.

In the negative case, that is, if the account management system does not have the expected digital testimony, the account management system is expected to reject the transaction or alternatively to suspend the progress of the transaction approval and/or to contact the customer for verification of his identity and his willingness to do the transaction.

It is worth noting that the customer can also send the digital signature through the Internet, that is, visiting the account manager site and transmitting the acoustic digital signature to his PC microphone, whereas the acoustic digital signature will be captured with the help of an ActiveX.

It should be appreciated that the PAN method working in conjunction with the client software (the purchaser cell-phone application) and the Server-IVR software of the present invention is able to improve fundamentally the security of remote transactions, maintaining the "faucet" (i.e., the customer's account) closed all the time that there is not a time-stamped digital signature on the type of transaction and the upper limit of the transaction amount, validated by the server.

In this way, it is possible:
to overcome the security problems of the ATM transactions without the cooperation of the ATM owners,
to overcome the security problems of the CC on-line transactions without the cooperation of the on-line merchants, nor the need to join forces with the CC companies,
to overcome the security problems of the CC on-the-spot transactions without the cooperation of the Acquirers, nor the Issuers nor the POS owners,
to overcome the security problems of the checks without the need to change anything,
to overcome the security problems of the on-line-banking without the need of a secure computer,
to overcome the security problems of phone-banking without the cooperation of the over-the-phone merchants (i.e., the customer can send his pre-authorization to the bank though any on-line PC while calling the over-the-phone merchant).

Furthermore, the PAN method is not weighty and complicated for the customer but fully optional. That is, if the customer is happy with the situation today (i.e., the "faucet" is open all the time), then it is fine, he has been warned by his bank and offered a security improvement and the customer has rejected it. If there will be a problem in the future, the customer cannot complain to the bank that he was not warned. There will be many customers that will prefer to put a ceiling, an upper limit or a trigger limit on the remote transactions. Beyond that trigger limit, they may desire to request the PAN method (e.g., ATM transaction higher than $3,000; a check higher than $5000, an on-line banking transaction higher than $1000; an e-commerce transaction higher than $100). All of these rules are referred collectively to as personal security policy of the customer.

Stated another way, any bank's customer can specify his personal security policy, because including the total rejection of the PAN is a way to state one particular security policy.

Oral Means:

In accordance with another embodiment of the present invention, a method for payments is provided wherein the customer is equipped with a portable device able to store and, eventually, able to transmit, by means of a given technology (e.g., Bluetooth, infrared, and the like), a specially modified X.509 certificate. This specially modified X.509 certificate is the encoding to bits of a declaration stating, among other things, that one precise and included CC account belongs to the owner of a given voiceprint (included in the statement), wherein this voiceprint was created by means of a given "speaker identification" technology at certain agreed upon conditions, and as said, the voice print is also included in the statement. Additionally, the declaration must be digitally signed by a trusted third party (i.e., a certification authority).

In more simple words, the modified X.509 of this invention is a digitally signed document associating a CC account with a voiceprint, and therefore, this link become unmalleable, and impossible to corrupt due to the digital signature.

The payment method may work as follows: he modified X.509 is transmitted by the portable device to, and captured by, another special device of the present invention, referred to as "bio POS" located at the store. This device will be ready to also capture the voice of the customer (i.e., the customer says—I would like to pay $55 with my "oral account") and, using one given speech recognition technology, in conjunction with the technology of "speaker identification" used to create the modified X.509 voiceprint, this "bio POS" will:

1. Recognize the customer's words (speech recognition technology).
2. Analyze the customer voice in order to determine the customer's voiceprint (the computed voiceprint).
3. Check the trusted third party digital signature on the special X.509.
4. Extract the signed voiceprint within the X.509.
5. Compare the two voiceprints (computed and extracted) if they are similar within tolerances.
6. Extract the signed identity (i.e., name, address) within the X.509 together with the CC data.
7. Display the customer name and the words uttered by the customer for confirmation.
8. Charge the cc account with the amount stipulated.

In this way the customer can charge his cc account paying without any other means than the portable device which carries and transmits the special X.509 and by using his verbal commands. No other person can charge such account because such person voice will be, in principle, different than the voice of the true owner, and consequently the computed voiceprint will be different than the signed one, and the bio POS will reject the transaction.

In accordance with another embodiment of the present invention, a payment method is provided by which the customer does not need to bring or carry any portable device or material gadget in order to charge his CC account.

In accordance with this embodiment of the present invention, there is a special X.509 Repository/or data base, which stores all the special X.509 certificates, wherein each one of the special X.509 is as described above and the above described BIO POS is connected to the repository, in a way that the bio POS can retrieve a copy of any desired special X.509.

This payment method, presented here may be summarized as follows:

Once the customer has decided to charge his CC account with a given amount in order to complete a transaction, the customer lets the bio POS know who he pretends to be, by speaking out his name, or his login number, or by entering his name into a bio POS keypad, or entering his login number, or by any other method resulting in enabling the bio POS to know who this customer pretend to be and more, which special X.509 correspond to him, in order to retrieve it from the repository.

Once the bio POS has retrieved the special X.508 of the person who the customer pretends to be, the bio POS will be ready to also capture the voice of the customer (e.g., the customer says: I would like to pay $55 with my CC account) and, by means of the technology of "speaker identification" used to create the modified X.509's voiceprint, and using in conjunction a given speech recognition technology, agreed upon in advance or established within the special X.509, this "Bio POS" will:

1. Recognize the customer's words (speech recognition technology).
2. Analyze the customer voice in order to determine the customer's voiceprint (the computed voiceprint).
3. Check the trusted third party digital signature on the special X.509.
4. Extract the signed voiceprint within the X.509.
5. Compare the two voiceprints (computed and extracted) if they are similar within tolerances.
6. Confirm that the customer declared identity (i.e., name, login number, etc) is, indeed, the one within the X.509, and therefore that the CC data included in the special X.509, in particular CC account belongs to the customer, and can be charged by him.
7. Display the customer name and the words uttered by the customer for confirmation.
8. Charge the cc account with the amount stipulated.

Referring now to the anti-phishing features:

Furthermore, the methods of payments described in accordance to various embodiments of the present invention may enjoy the "anti-phishing" features, as described in the U.S. Pat. No. 6,957,185, granted to the applicant of this patent application, wherein the server, after receiving the customer digital signature, authenticates itself in front of the customer and/or the seller, generating and transmitting a variable and specific code for each transaction (i.e., each received digital signature) and wherein the server transmits the variable codes to the seller, the seller's transaction specific code, and through the seller to the customer, the customer's transaction specific code respectively, and wherein each of them, or at least one of them, compares the received variable code with their respective cellular phone application of the present invention. In the case that the customer compares the received variable code, received after sending the digital signature on the type of transaction and amount, and find out that such one time code is identical to the one displayed in his cell-phone display, he can be assured that he is dealing with his true service provider and not with a phished service. The same can be said for the seller. It is practically impossible for a phisher or for a phished server to guess the number the purchaser's cell-phone application will display after sending the digital signature. Only the CSS knows how to compute this one time code.

BRIEF DESCRIPTION OF THE DRAWINGS

A more complete understanding of the present invention may be derived by referring to the detailed description and claims when considered in connection with the drawing Figures, where like reference numbers refer to similar elements throughout the Figures and:

FIGS. 1-4 illustrate a flow diagram for the method POS FREE 1001;

FIGS. 5-8 illustrate a flow diagram for the method Form-Filler [103];

FIGS. 9-12 illustrate a flow diagram for method: Over-the-phone transactions [104b];

FIG. 13 illustrates a flow diagram describing the PAN's enrollment;

FIGS. 14 and 15 illustrate a flow diagram for the operation of Non-Disruptive PAN [106];

FIG. 16 illustrates a flow diagram for enrollment for method 108;

FIGS. 17 and 18 illustrate a flow diagram for method [108] operation; and

FIGS. 19-22 illustrate a flow diagram for case Adaptor 102.

DETAILED DESCRIPTION

Figure 1:
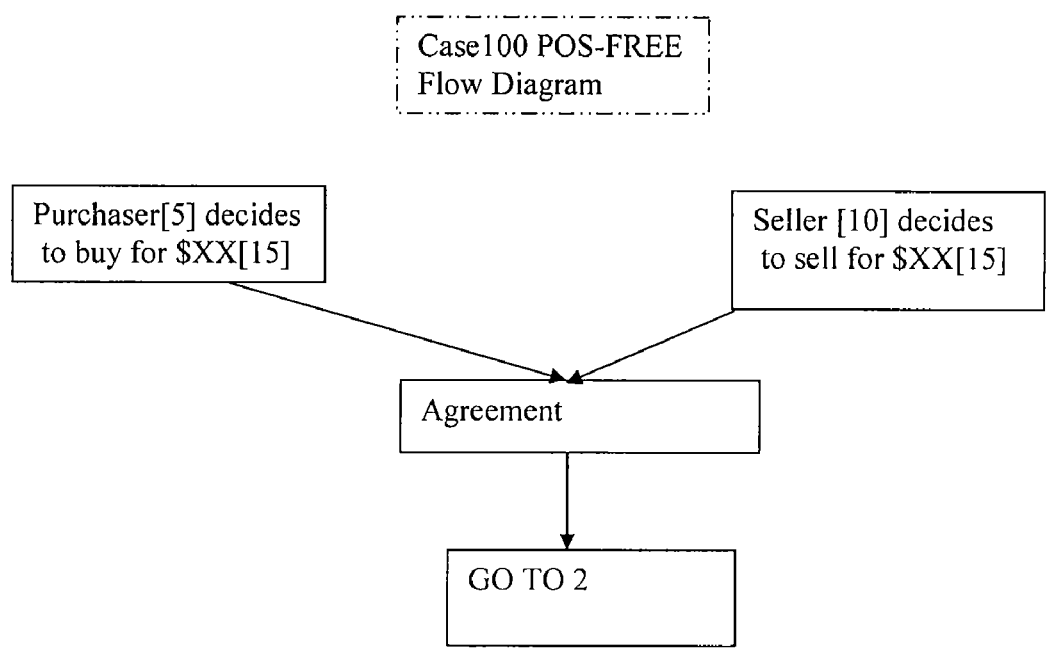

The present invention may be described herein in terms of various components and processing steps. It should be appreciated that such components and steps may be realized by any number of hardware and software components configured to perform the specified functions. For example, the present invention may employ various electronic control devices, visual display devices, input terminals and the like, which may carry out a variety of functions under the control of one or more control systems, microprocessors or other control devices. In addition, the present invention may be practiced in any number of financial transaction contexts and the exemplary embodiments relating to a system and method for a secure payment system are merely a few of the exemplary applications for the invention. For example, the principles, features and methods discussed may be applied to any situation involving a financial transaction between a seller and a purchaser.

With reference to the figures, in accordance with one embodiment of the present invention, a payments systems [100] is provided in which a purchaser [5] uses his cell-phone [1] or any other portable device [1] instead of a conventional plastic card [2] with a magnetic stripe[3], in order to charge his credit [4] or debit account [4]. One of the common characteristic of several of the payments systems presented here below is that all they use the service of a Central Service [6] of the present invention.

Therefore, in accordance with this embodiment of the present invention, a method [100 ] is provided that utilizes software applications that run in cell-phones. These cell-phones are the purchaser's cell-phone [1] and/or seller's cell-phone [18]. In addition, the payment system of the present invention further comprises a server [8] and IVR software [9] which constitutes together the elements of one of the payment systems of the present invention referred as POS-Free Payment System [100].

This payment system [100] enables the customers or purchasers [5], to pay by means of their respective cell-phones [1] or any other personal device [1] carried by the purchasers [5] and by using the service of Central Service [6] of the present invention which is equipped with a server [8] and an IVR [9] (Interactive Voice Response).

Table of additional elements used in method 100:
1. Purchaser's Cell-phone application [17].
2. Seller's Cell-phone application [13].
3. IVR software [9].
4. Server software [8].

In accordance with this embodiment of the present invention, in this case [100] the cell-phone or device [1] runs the software application.

As a result of the use of such cell-phone application [17] the purchaser [5] is paying to a seller [10] by charging his purchaser's CC or debit card account (as previously stated, the term CC also refers to debit cards, charge cards, smart cards, pre-paid cards, gift cards, and the like) [4].

In accordance with this embodiment of the present invention, case [100] includes where the seller [10] may have not any POS [11] (Point-of-Sale device), may have not any CC network [12] available, may have no electric power, but uses the seller's cell-phone [18], which has installed the seller's cell-phone application [13], as a sole instrument to complete a secure, verified, and certified CC transaction [14]; wherein the cell-phone [18] runs one of the versions of a seller's application software of the present invention [13].

According to this POS Free System [100] presented here, when a participant purchaser [5] agrees with a participant seller [10] and decides to charge his CC account [4] a specific amount [15] to be paid to the seller [10] (i.e., the transaction amount [15]), the purchaser [5] communicates his willingness to do so to the seller [10], and the seller [10], wherever he will be, picks up the seller's cell-phone [18] and selects, pushing some buttons or selecting some icons [16] or the like, to activate the seller's cell-phone application's [13]. In this manner, the seller [10] launches the previously installed application [13] of the present invention for vendors which runs in his cell-phone [18].

In accordance with this embodiment of the present invention, application [13] may prompt the seller [10] to identify himself to the application [13], for example, by entering a seller's PIN [19], and, as well, application [13] may request from the seller [10] to enter the amount of the transaction [15]. The seller's cell phone application [13] may now digitally sign (time-stamped) a string [20] including at least the transaction's amount [15], with the seller's digital signature [25].

Furthermore, the seller's application [13] encodes the seller's digital signature [25] to sound [26].

This encoding to sound steps may be accomplished according to the technology described in U.S. Pat. No. 6,236,724, applied by the applicant of this patent application.

Such seller's acoustic digital signature [26] is transmitted to the IVR [9], for example by placing a call [21] to the Central Service IVR [9] which is connected to the Server [8].

Once the seller [10] fulfill such requisites or in parallel, the purchaser [5] may pick up the purchaser's cell-phone [1], and select the purchaser application [17]'s icon of the present invention and activate the application [17].

In accordance with an aspect of the present invention, the purchaser's application [17] may prompt the cell-phone owner (the purchaser [5]) to authenticate himself by entering a PIN [35] or other identification information, such as biometric identification, and to enter the transaction amount [15] that the purchaser [5] is willing to charge his CC account [4] in benefit of the seller [10].

Once the Purchaser [5] accomplishes this task, he places his cell phone [1] near the seller's cell phone [18]. Now, the purchaser's cell-phone [1], by means of the application [17], generates an acoustic message [22].

The purchaser's acoustic message [22] carries and contains a string [23] with the date and time and the amount [15] the purchaser [5] accepted to pay, amongst other data (e.g., type of transaction determined by the icon selection).

Furthermore, the string [23] is digitally signed by the application [1;] with the purchaser's digital signature [24]. The string may be digitally signed in accordance with the method presented in the Great Britain Patent Number 2,374,182, applied by the applicant of this patent application.

The resultant digital signature [24] is encoded to sound. The sound [22] carrying the encoded purchaser's digital signature [24], referred here below also as acoustic message [22] or acoustic digital signature [22] is captured by the seller's cell phone [18] and transmitted to the IVR [9] though the voice channel. In accordance to the present embodiment, this may be similar to call [21] as earlier described.

As a result of the actions of the seller [10] and purchaser [5], the IVR [9] has received two digital signatures [22, 26], coming from the seller's cell-phone [18], and the IVR [9] has converted them into purchaser's [24] and seller's [25] digital signatures respectively by decoding them. In addition, the IVR [9] transmits the purchaser's [24] and seller's [25] digital signatures to the central service server [8].

The central service server [8] receives the two encoded digital signatures belonging to the seller [10] and the purchaser [5] respectively.

Now the central service server [8] checks and verified each of the encoded digital signatures [24] and [25], and eventually, if both are truthful digital signatures, the central service server [8] identifies the seller [10] and the purchaser [5] by means of retrieving the respective X.509 certificates whose respective serial numbers were within the digital signatures [24] and [25]. Furthermore, the server [8] verifies if the transaction amounts [15] are identical and, eventually, the CSS [8] retrieves the purchaser's CC account [4] data, as well as the Seller's account [27b] data and acting as a POS [11] system, executes the CC transaction [14], impersonating the seller [10] and the purchaser [5].

Once the central service server [8], operating as a POS [11] system receives the transaction confirmation [28], for example, from the CC company network [12], the central service server [8] stores the two received digital signatures [24,25], and returns to the seller [10] uttering (text-to-speech) a confirmation phrase, including a confirmation number, for the seller [10] to hear and finish the call [21].

The CS [6] may send to the customer and/or seller by e-mail, conventional mail or any kind of communication system (e.g., SMS), a copy of the transaction confirmation with all the available data, optionally signed, by the CS [6] itself.

In this manner, the purchaser [5] has paid to the seller [10] the sum [15] he decided to pay, charging a credit card account [4] belonging to the purchaser, which may be one associated with a magnetic stripe plastic card or not.

In accordance with another embodiment of the present invention, where there is not an associated plastic CC [2], the CC account is a kind of virtual CC account [29] which is usable only by means of the purchaser's cell-phone application [17].

Furthermore, as a result of these actions, the seller account [27c] has been credited by the acquirer [30] and/or the CC company, the exact sum the seller [10] expected to be credited as if the seller had used a conventional POS [11] system and had swiped the customer plastic credit card [2], while in the practice he had used an application installed in his cell-phone [13].

It should be appreciated, that the only thing the seller did was to use the application [13] in his cell-phone and that is implies that the seller [10] enjoys a total mobility, he [10] does not need to be in his office or his facilities, but he can complete a CC transaction [14] in any place all over the world, all the time his cell-phone [18] works as a phone.

Additionally, the transaction [14] completed as per the method, software and servers of the present invention [100] is by far more secure than a conventional magnetic strip card based transaction.

This is due to the fact that in accordance with various embodiments of the present invention, there is a digital signature [24] coming from the purchaser [5], with a time stamp and the amount, stating categorically and undeniably the willingness of the purchaser [5] to make a transaction [14], and charging one particular Credit Card account [40] of the purchaser [5].

The purchaser's digital signature [24] is completed by using standards such as the PKCS#7, that is, the usage of the purchaser's private key [31], which is known only by the purchaser [5], and avoiding repudiation, constitutes a digital proof [32b] of the willingness of the purchaser [5] to complete the transaction [14]. Also, the seller digital signature [25], on the time and date and amount [15], whereas the amounts [15] signed by the purchaser and the seller should be exactly the same amount, in order to indicate the mutual acceptance [33] of the purchaser [5] and the seller [10] to complete the transaction [14], constitutes a digital proof [32b] against any denial or impersonation claim [34].

In order to better determine the presented case [100] let's summarize the case's steps:

The seller [10] selects the application [13] in his cell-phone [18] and enters the PIN [19], the transaction amount [15] and invites the purchaser [5] to proceed with his cell-phone's purchaser's application [17].

The customer [5] picks-up his cell-phone [1], selects the application [17], enters the PIN [35] or other identification information, enters the amount [15], and places the customer's cell-phone [1] in proximity to the seller's cell-phone [18], and presses SEND.

The purchaser's cell-phone application [17] generates a digital signature over the time-stamp and the amount [15] and encodes it to sound (purchaser's acoustic digital signature) [22].

The seller's cell-phone application [13], which has already placed a call [21] to the IVR [9], and have already, sent the seller's acoustic digital signature [26] captures the purchaser's acoustic digital signature [22], transmits it to the Server's IVR [9]. Now the seller's cell-phone Application [13] waits for a response.

The IVR [9] captures the acoustic digital signatures [22, 26], decodes them and transmits the digital signatures [24, 25] to the Server [8].

The Platform's Server [8]:

PS1) receives the customer's and seller's digital signatures [24, 25].

PS2) verifies the digital signatures, compares the amounts, and verifies the time coincidence, checks if the difference is within tolerance [36].

PS3) retrieves the sellers account data [27b] and the customers account data [4]

PS4) transaction approval: The Server [8] acting as a conventional POS [11] transmits to the CC company (i.e.: the issuer [37]) by means of the network [12] the transaction's data for approval, and if approved, the CC company [37] returns to the Server [8] with an Authorization Number [28].

PS5) the Server [8] stores the customer's and seller's digital signature [24, 25] and returns to the seller [10] with a Confirmation number [38]. Furthermore, the server [8] may send an SMS, e-mail, etc to the purchaser [5]. Alternatively, the server [8] can send a one-time-code to the purchaser [5] through the seller phone [18] in order to authenticate itself in front of the seller [10] and or the purchaser [5] as we will explain below.

Referring now to the security aspects of the case presented [100] the Purchaser's Cell-phone application [17] will generate a time-stamped digital signature [24] only when the customer [5] enters the exact PIN [35]. This PIN [35] is the key for decrypting the private Key according with a method presented in the Israeli patent application number 173463, applied by the Applicant of this application.

Further, referring to the method presented here in accordance with an embodiment of the present invention, one configuration is that the CC issuer [37] will only enable the transaction [14] with such CC/debit card [4] when there is a Platform server [8] notification [42] of the willing of the purchaser [5] to execute the transaction [14] represented by a notification [42] from the server [8] emitted after receiving a valid, synchronized digital signature [24] of the authorized owner [5].

FIGS. 1 to 4 illustrate a flow diagram for the method POS FREE 100.

POS-Free and Seller's Application Free Case.

A further variation [101] of the method presented [100] is a case where the seller [10] does not have the seller's application [13], nor any special application related to this method, installed in his cell-phone.

Nevertheless, he [10] is, indeed, a participant seller, that is, the seller has registered himself for the service [6] and he [10] as opened a CC acquirer's account [27c], an account where he can receive money from the transactions he completed.

In this case [101], everything is as in the case presented before [100] with the exception that the seller does not sends his digital signature, but instead identifies itself against the IVR [9] following a IVR's menu and using DTMF tones.

The seller [10] also sends the expected amount [15] due to the transaction [14]. The purchaser [5], who has the purchaser's application [17], sends his acoustic digital signature [22] as before, through the seller's phone [18], which can be also, in this case [101] a regular phone and not necessarily a cellular one.

Conventional POS Case [102].

The above case was for the situation in which the Seller has no POS available and in one of the cases referred above [100], the Seller [10] uses an application previously installed in his cell-phone [18] in order to complete the CC transaction [14].

Let's refer now to the case [102] in which the seller [10] does have a conventional POS [11].

We refer here to a POS [11] able to read a conventional plastic card [2] with magnetic strip [3]. Assume also that the purchaser [5] has no plastic CC [2] for the CC account [4] he is willing to charge, but instead he [5] has the purchaser's application of this invention [17] previously installed in the purchaser's cell-phone [1]

For this case [102], according to a configuration of the present invention we present an Adaptor [39] of this invention that enables the seller [10] to charge the purchaser's CC account [4] using his conventional POS [11].

The Adaptor [139] is a device able to capture, by means of a microphone [40] the purchaser's cell-phone generated acoustic message [22] carrying the purchaser's digital signature encoded to sound.

Also the Adaptor [39] is able to decode such encoded digital signature [22], to transmit such decoded digital signature [24] to the Central Service Server [8], whereas the Central Service Server [8] receives the digital signature [24] belonging to the purchaser [5], checks and verified such digital signature [24], and eventually, if it is a truthful digital signature, the Central Service Server [8] identifies the purchaser [5] by means of retrieving the respective X.509 certificate, whose serial numbers was within the digital signature [24], and, eventually, the CSS [8] stores the received digital signature [24].

Further the CSS [8] retrieves the purchaser's CC account data [4], and, assuming all the checks have been OK, it [39] transmits the CC account data [4] back to the said Adaptor [39].

Now the Adaptor [139] is in possession of all the purchaser's CC account data [4] needed in order to magnetically write in a conventional plastic card magnetic stripe [3] the received data [4] or parts of it. The idea is to create a temporarily clone or a temporarily conventional plastic credit card [41] corresponding to the respective purchaser's CC account [4].

Once the Adaptor [39] has written in the said plastic card's magnetic strip [3] the received data [4], the plastic card [41] is extracted from or expelled by the adaptor [39] and this temporarily CC [41] is ready to be used in the Seller's conventional POS [11], as any standard plastic CC [22].

One configuration for method [102] is that, once used, the "clone" credit card [41] with the purchaser's account data [4] will be returned to the adaptor [39] of this invention [39] after having been swiped in the conventional POS [11].

Doing so, the magnetic stripe's purchaser data [4] will be erased by the adaptor [39].

Therefore as a result of the use of the said adaptor [39] the seller [10] was able to complete a CC transaction, using a conventional POS [11], including in the case the customer [5] has no plastic Credit Card [2], but his cell-phone [1] with the special application of this invention for a purchaser [17].

In order to better clarify this case [102] let's summarize the procedure:

The seller [10]: enters in the adaptor [39] the transaction amount [15] and invites the customer [5] to proceed with his purchaser's cell-phone application [17].

The customer [5]: picks-up his cell-phone [1], selects the purchaser's cell-phone application [17], enters the PIN [35], enters the amount [15], and approaches the cell-phone [1] to the adaptor's microphone [40], and presses SEND.

The purchaser's cell-phone application [17]: generates a digital signature over the time-stamp and the amount [24] and encodes it to sound (acoustic digital signature [22]).

The Adaptor [39]: captures the acoustic digital signature [22], decodes it, and transmits it to the CSS [8] together with the seller's data [27a] and amount [15]. Waits for response.

The CSS [8]:

PS1) receives the digital signature [24], and seller's data [27a].

PS2) verifies the digital signature [24], compares the amounts [15], and verifies the time coincidence, i.e.: if within tolerance [36].

PS3) retrieves the seller's account data [27b] and the customer's account data.

PS4) The server, in accordance with an embodiment of the present invention, transmits to the Issuer [37] the transaction data for notification [42] of the willing of the purchaser [5] to execute the referred transaction [14], and if eventually everything is fine, the Issuer [37] returns to the Server [8] with a Pre-Authorization's reception Number. Also, when at due time, the issuer [37] will receive the request to approval of the transaction [14] originated in the POS [11], the issuer [37] will check if the notification [42] has been received for such transaction amount [15], and if positive, to enable the transaction 14 (assuming all the other regular requisites are fulfilled).

PS5) the server [8]: stores the customer's digital signature [24] and returns to the adaptor [39] with the Customer [5] credit card data [4].

The adaptor [39]: writes on a temporarily card's magnetic Stripe the Customer credit card data [4] creating a "clone" card [41] which is ejected from the adaptor [39], handed by the seller, and swiped in the conventional POS [11] magnetic card reader.

The POS [11] reads the Customer's credit card data [4] and completes the transaction [14] as usual. The "clone" card [41] is returned to adaptor [39] to be erased.

One variation of the case [102] is a Universal POS Adaptor [44], consisting in an adaptor like before [39] with the additional features that enable it to capture messages not only acoustically [22], but also through USB, Bluetooth, Wi-Fi infrared or any other transmission technology or standard, generating as before a magnetic stripe information able to be read by a conventional POS [11], and in this way to enable to complete transactions with any possible gadget not compatible with or acceptable to a conventional POS [11].

FIGS. 19 to 22 illustrates a flow diagram for case Adaptor 102.

SPECIAL POS Case:

In accordance with an embodiment of the present invention, a special POS referred as Acoustic POS [45] is able to capture the acoustic messages [22] generated by the Cell-phone purchaser's application of this invention [17].

We refer here to a device [45] with all the features and capabilities of a conventional POS [11] which, in addition, is able to work directly with the cell-phone applications [17] of this invention, and it is equipped with a microphone.

The Acoustic POS [45] has means to capture an acoustic message, like a microphone, and one or more CPUs. This Acoustic POS [45] is able to capture and decode the said acoustic message [22] generated by the purchaser's cell-phone application of this invention [17] into a digital string [24] recuperating the purchaser's digital signature [24]. This acoustic POS [45] is able also to generate a message with the time and date, and optionally, the transaction amount, entered by the seller. The Acoustic POS [45] will transmit the message, with the purchaser's and the seller's input, to the Central service Server [8], in order to enable the server [8] to proceed as in the above mentioned cases [100,101,102]. Thus the server [8] will check the purchaser's digital signature [24], will retrieve the purchaser CC data [4] and will transmit such data [4] to the Acoustic POS [45], in order to enable the Acoustic POS [45] to proceed with a conventional POS transaction.

In others words the CSS [8] will verify the purchaser's digital signature [24], identify the purchaser [5], retrieve the purchaser CC data [4] and transmit the relevant data to the Acoustic POS [45] for the completion of the transaction by such Acoustic POS [45].

In accordance with this embodiment of the present invention, the CSS [8] will store the received digital signatures [24] as digital testimonies [32] of the willingness of the parties to do the specific transaction.

FORM Filler Case for On-Line Transactions:

It is an additional object of this invention to present a solution [103] for on-line purchasing [46].

The solution [103] consists on a method, and software for easing the cumbersome procedures nowadays in use to complete an on-line transaction [46] based on CC or debit cards.

We refer specially to the fact that, in most of the conventional cases, the on-line purchaser [47] must fulfill a form [48] with all the necessary information [49] including name, address, etc., in order to enable the on-line transaction [46].

It is well known by the people skilled in this art that a considerable percent of the potential on-line purchasers abandon or drop or discontinue the on-line purchasing procedure [46] precisely during the fulfilling of the said weighty form [48].

The method and software for on-line purchasing of this invention [103] consists of the same Purchaser's cell-phone application [17] as in the other cases referred above [100, 101, 102] and, additionally, a software application [50], easy to download into the potential on-line purchaser's PC [51] and, where the installation of such software [50] is effortless, i.e.: like the ActiveX Microsoft technology.

TABLE of additional elements as per method [103]

1. Purchaser's ActiveX [50] application.
2. Purchaser cell-phone application [17].
3. Server software [8].

This software for on-line purchasing of this invention (ActiveX) [50], once installed in the on-line purchaser's PC [51], and by means of the PC's microphone [52], is able to capture the acoustic message [22] generated by the cell-phone purchaser's application [17] according the invention presented here, i.e.: the acoustic message [22] carrying the encoded to sound version of the purchaser's digital signature [24] on the date and time and the transaction amount [15].

The software for on-line purchaser's PC (ActiveX) [50] has the capability to decode the encoded digital signature [22] and to transmit such recuperated digital signature [24] to the CSS [8], whereas the CSS [8].

PS1) receives the customer's digital signature [24].

PS2) verifies the digital signature [24], and verifies the time coincidence, checks if the difference is within tolerance [36], eventually, stores the digital signature [24].

PS3) identifies the on-line purchaser [47], retrieves the customers account data [4].

PS4) optional transaction notification: The Server [8] notifies the CC issuer [37] about the willing of the authorized owner [5] to charge the CC account [4].

PS5) returns to the PC software application [50] with the customer's data [4] including personal data-needed to fulfill the form [48].

Now the PC application [50] fulfills the transaction form [48].

Once the form [48] is completed, the on-line purchaser [47] is expected to continue with the normal transaction procedure.

It is worth to note that this [103] method for on-line purchasing [46] not only makes the buying experience easier, by automatically fulfilling the form [48] but improves the security of the transaction n[14]. The issuer [37] will reject any transaction [14] all the time there is no a pre-notification [42].

Hence the form [48] is filled automatically and conveniently, by the application [50] running in the PC (ActiveX), and the purchaser [47] can send the fulfilled form [48] back to the seller's site to proceed with the on-line operation [46].

FIGS. 5 to 8 illustrate a flow diagram for the method Form-Filler [103].

In others words, let assume that the customer is visiting the sellers web-site, any site, not necessary a participant merchant site, but any on-the-web merchant's site who honors CC.

The customer being a participant customer has a cell-phone with the Purchaser's application (a cell-phone with the download referred as Purchaser's application of this invention [17]).

He is using any PC, not necessary a secure one, neither is it required any pre-installation of any special soft on the said PC but the ActiveX [50] which is completed in seconds in a transparent way.

The on-line Seller [53] is not required to have nothing special in his site, being a non participant merchant or a non necessarily participant merchant.

As in the cases referred above the CSS [8] will play a role in this procedure as well.

The customer [47]: he is visiting seller's site with any PC [51] and decides to buy; he receives an extensive form [48] to fill, including his name, Credit/Debit card data, address, etc.

The customer [47] browses to the CSS [8] site or any alternative site and downloads an ActiveX (Form Filler ActiveX [50]). He picks-up his cell-phone [1] selects the Purchaser's application [17], enters the PIN, enters the amount [15], and presses SEND when his cell-phone [1] is close to the PC micro [52].

The Purchaser's application [17]: computes a digital signature [24] over the time-stamp and the amount [15] and encodes it to sound (acoustic digital signature [22]).

The ActiveX [50]: captures the acoustic signature [22], decodes it, and transmits it to the CSS [8].

The CSS [8] receives the customer's digital signature, verifies the digital signature, and verifies the time coincidence, i.e.: if within tolerance. Now the CSS [8] retrieves the customers account data. Optionally, the CSS [8] may notify the Issuer [37] about the coming on-line transaction [46] with a specific upper limit, and within a short window of time. This notification [42] may be signed by the CSS [8].

The Server [8] transmits to the CC Issuer [37] the transaction data for notification [42] of the willing of the customer [47] to do a transaction [46] such this and paying with his CC account, and if eventually everything is fine, the Issuer [37] returns to the Server [8] with an Notification Reception Confirmation Message.

The Server [8] stores the customer's digital signature [24] and returns to the customer's PC application [50] with the necessary data to fulfill the form [48].

The ActiveX [50] receives the data, and fulfills the form [48].

The customer [47] proceed with the on-line purchasing according to the seller [53] instructions using the already fulfilled seller's form [48] and the transaction [46] becomes a standard transaction for the Seller [53].

Let's refer here about the meaning of the term Digital Testimony in this application: The Server [8] will receive the digital signature [24] from the IVR [9] or in some cases directly (i.e.: ASP [64] pages). It [8] will check the validity of such digital signature [24], and, eventually, if everything is right, will prepare a digitally-signed-by-the-Server document [42] stating the verified-by-the-server customer's willing to accomplish a specific type of transaction (i.e.: ATM transaction, CC on-the-spot, etc) up to the upper-amount limit within a short period of time [63]. Let's refer to this digitally-signed-by-the-Server document as a Digital Testimony [32], which is one type of notification [42]. Now the server [8] will transmit the Digital Testimony [32] to the account manager [68] (the customer's bank mainframe, the CC issuer platform, etc) or to the Seller, according with each case presented.

Over-the-phone, no POS case:

It is a further object of this invention to present a method [104] for using the cell phone application [17] for over-the-phone transactions [54].

We refer here to the case [104] where the over-the-phone customer [55] is willing to make an over-the-phone transaction [54] using the cell-phone purchaser's application of this invention [17].

We will assume that the over-the-phone merchant [56] is a participant merchant and has an on-line PC [57] equipped with a microphone [58]. The Seller [56] is not necessarily equipped with a POS [11] and while he will use a PC [57], this PC doesn't need to have any special application installed previously. Also the Seller [56] will have nothing special in his cell-phone and can receive calls in any phone.

As in all the cases above the CSS [8] plays a capital role as a service [6].

Thus there will be a CSS [8] connected with the CC company network [12], and the connection between the seller's PC [57] and the server [8] will be the internet, and more precisely by means of ASP pages [64], whereas the server [8] sends an ActiveX of the type mentioned above [50] to the PC [57].

The case [104] procedure will be as follows:

The over-the-phone customer [55]: picks-up his cell-phone [59], calls the seller's phone number (any type of phone) and at a given time decides to buy a good or service.

The seller [56]: using his PC [57] goes to Central Service [6] site [60], receives an ActiveX [50] (only the first time) and the PC will communicates with the server [8] by means of ASP pages [64] The seller [56] enters his login name, PIN and the transaction amount in the ASP [64] and invites the customer [55] to proceed with his purchaser cell-phone application [17].

The customer [55]: selects the application [17], enters his PIN, enters the amount, selects the purchaser cell-phone application icon [62] for over-the-phone transactions, and presses SEND.

The purchaser cell-phone application [17]: generates a digital signature over the time-stamp and the amount [24] and encodes it to sound (acoustic digital signature [22]) and sends it through the voice channel.

The Seller [56] approaches his phone [61] to the PC's micro [58].

The PC's ActiveX [50] captures the acoustic digital signature [22] sent by the customer, decodes it, and transmits it to the ASP [64] and the ASP transmit it to the Platform's Server [8].

The Platform Server:

PS1) receives the customer's digital signature [24] and seller's imputed data though the ASP [64].

PS2) verifies the digital signature [22], compares the amounts, and verifies the time coincidence (if between tolerance [36]).

PS3) retrieves the sellers account data and the customers account data.

PS4) The Server, acting as a POS, transmits through the CC company network [12] the transaction data for approval, and if eventually everything is fine, the CC company returns to the Server [8] with a confirmation number which is displayed for the over-the-phone merchant [56] in his PC [57] through the ASP [64].

PS5) the Server [8] stores the customer's digital signature [24] and seller's data for future auditing and returns to the seller's PC [57] with a Confirmation number, as said above, or Digital Testimony [32] signed by the server [8].

PS6) according to one configuration, the server [8] confirms the transaction sending an SMS, e-mail, etc to the customer and or merchant.

Over-the-Phone using POS Case:

It is a further object of this invention to present a method [104b] for using the cell phone application [17] for over-the-phone transactions [54].

We refer here to the case [104b] where the over-the-phone customer [55] is willing to make an over-the-phone transaction [54] using the cell-phone purchaser's application of this invention [17].

We will assume here that the over-the-phone merchant [56] is a participant merchant and has an on-line PC [57] equipped with a microphone [58]. The Seller [56] is equipped with a conventional POS [11] able to accept manually entered data and while he will use a PC. [57], this PC doesn't need to have any special application installed previously. Also the Seller [56] will have nothing special in his cell-phone and can receive calls in any phone.

As in all the cases above the CSS [8] plays a capital role as a service [6].

Thus there will be a CSS [8] and the connection between the seller's PC [57] and the server [8] will be the internet, and more precisely by means of ASP pages [64], whereas the server [8] sends an ActiveX of the type mentioned above [50] to the PC [57].

Table of additional elements as per case [104b].
1. Seller's ActiveX [50] application.
2. Purchaser's cell-phone application [17].
3. Server software [8].

The case [104b] procedure will be as follows:

The over-the-phone customer [55]: picks-up his cell-phone [59], calls the seller's phone number (any type of phone) and at a given time decides to buy a good or service.

The seller [56]: using his PC [57] goes to Central Service [6] site [60], receives an ActiveX [50] and the PC [57] will communicates with the server [8] by means of ASP pages [64] The seller [56] enters his login name, PIN and the transaction amount in the ASP [64] and invites the customer [55] to proceed with his purchaser cell-phone application [17].

The customer [55]: selects the application [17], enters his PIN, enters the amount, selects the purchaser cell-phone application icon [62] for over-the-phone transactions, and presses SEND.

The purchaser cell-phone application [17]: generates a digital signature over the time-stamp and the amount [24] and encodes it to sound (acoustic digital signature [22]) and sends it through the voice channel.

The Seller [56] approaches his phone [61] to the PC's micro [58]

The PC's ActiveX [50] captures the acoustic digital signature [22] sent by the customer, decodes it, and transmits it to the ASP [64] and the ASP transmit it to the Platform's Server [8].

The Platform Server:
PS1) receives the customer's digital signature [24] and seller's imputed data though the ASP [64].

PS2) verifies the digital signature [22], compares the amounts, and verifies the time coincidence (if between tolerance [36]).

PS3) retrieves the sellers account data and the customers account data.

PS4) The Server notifies the Purchaser's Issuer about the intention [63] of the purchaser to complete a transaction over the phone for the amount not higher than the amount given [37].

PS5) the Server [8] stores the customer's digital signature [24] and seller's data for future auditing and returns to the seller's PC [57] with al the customer account data needed to proceed, as said above, or Digital Testimony [32] signed by the server [8].

The seller [56] proceeds with the transaction as usual, using the conventional POS [11].

FIGS. 9 to 12 illustrate a red flow diagram for method: Over-the-phone transactions [104b].

Pre-Authorization Notification:

It is a further object of this invention to present a method [105] to pre-announce to the Purchaser's CC issuer [37] or, alternatively, to the purchaser's bank, or to the entity which manages the purchaser's account, the intention [63] of the true account's owner [7] to complete a transaction. The said announcement is backed by the purchaser digital signature [24] previously verified by the server [8].

We mean here that the true and authorized account's owner [7] has been authenticated by the server [8], by means of his digital signature, due to the fact that only the account owner has access to the private key within the cellular application [17], and thus only he can generate a digital signature [24].

The server identifies the signor of the digital signature by means of the x.509 certificate.

Once the signor has been identified, the server [8] retrieves the corresponding account, whereas the association owner-account has been made during the enrollment.

Thus the owner, by identified himself by means of his/her digital signature stamped on the time and date as well as on the amount and type of the transaction, has let the CSS [8] know of his willing to complete a transaction [63] as in most of the cases mentioned above. Now the CSS [8] can inform or notify the Purchaser's CC issuer [37] or, alternatively, to the purchaser's bank, or to the entity which manage the purchaser's account about the intention [63] of the true account's owner [7] to complete a transaction.

Referring now to the security aspects it is worth to note that the Purchaser application [17] will generate a Time stamped digital signature [24] only when the customer enters the correct PIN, known only by the authorized owner of the CC. This secret PIN is not written in the Cell-phone memory, and it is the key for decrypting the private Key according with the procedure and method described in the Israeli patent application number 173463 applied by the author of this application.

It is optional that the CC Issuer [37] or account manager will only enable transactions with such Credit Card/debit card, if it has received a Signed-by-the-CSS notification [42, 32] of the authorization of the account owner to do a transaction not higher that the amount digitally signed (the upper limit authorized), within a pre agreed and short window of time (i.e.: up to 10 minutes after the digitally signed time stamp).

Therefore, the CSS [8] will notify the Issuer [37] about the account owner's willing [63] only after receiving a valid, Time Stamped digital signature of the authorized owner [7] over the amount (upper limit). Due to the fact that this digital signature based authorization notification riches the CC Issuer [37] before or simultaneously with the conventional transaction approval request, we refer to it as Pre-Authorization Notification (PAN [65]).

It is worth to note that the PAN [65] is a valid option for all the cases presented here, and strongly increases the security of the use of CC for any transaction, on-the-spot, as over-the-net, as well as over-the-phone, and in general, any transaction where the account manager (i.e.: the issuer, the bank, etc) does not see the account owner [7].

As it is well known, the lack of compelling identification of the transactor [5, 47, 55], (i.e.: the person which intents to buy with the CC), by the only entity [37] (Issuer, bank) that positively knows the account's owner [7] is the Identity Theft most enabling factor.

Therefore, due to the fact that the PAN's implies the previous or simultaneous notification by the CSS [8] (digitally signed) to the account manager [37] (issuer or Bank) of the willing of the account owner [63], positively identified by the CSS [8] using the X.509 certificate, to accomplish a transaction with an upper limit amount, within a short period of time, and the validity of this willing is supported and corroborated by the account owner's digital signature, as a Digital Testimony [32] of his/her desire, the Identity theft will not be viable.

Consequently, requesting the PAN [65] for some or all the transaction with one particular account [4] will strongly increase the security of such account [4].

And this security strengthening is valid for any type of remote transaction [66], which are referred here as a transaction where the entity which knows the account owner, usually the bank itself who manage such account, does not "see" the customer. In others words, any transaction accomplished without the bank employee's personal verification of the identification of the account owner, as an ATM (Automatic Teller Machine) transaction, a phone-banking transaction, a on-line banking transaction, a check based transaction, a fax based transaction, any CC based transaction, on-the-spot, e-commerce, over-the-phone or automatic dispenser and in general, any transaction affecting the account moneys whereas the identity of the transactor, i.e.: the question if the transactor is the authorized person to withdraw moneys from the account or an impostor, cannot be checked by a bank employee.

For all this cases, the PAN [65] provides to be a clear-cut security solution due to the fact that the account manager may reject any of such remote transaction attempts, of the type named above, if he does not have the notification [42] of the CSS [8] about the perfectly secure and non-repudiable identification of the account owner [7] based in digital signature technologies, and not only the identification but also the corroboration, within the notification [42], about the willing of the owner to accomplish [63] at such time (i.e.: within 5 minutes of the time-stamp), such type of transaction (i.e.: ATM) with such upper limit (i.e.: up to US$150).

Pre-authorization non-disrupting: "Freeze-unfreeze-the account".

It is a further object of this invention to present a method [106] of securing a remote transaction [66] without disruption of the present in use procedure to accomplish such remote transaction [66].

We refer here to remote transactions [66] whereas there is an entity who manages a customer's account [68], like a bank, and whereas the account owner [7] provides instructions to such account manager [68], during the enrollment to the PAN [65] service, to halt certain types of remote transactions, if some condition have not fulfilled. The conditions may be that a previous notification [42] authorizing the execution of the transaction should been received from the CSS (8), for the respective amount and time window.

Alternatively, the customer may request to halt the execution of certain remote transactions, only in the case the transaction amount exceed a lower limit [70] (a trigger for the requesting of the PAN [42]) requested by the customer in order to trigger the PAM request i.e.: notification [42] request. Thus, if indeed the transaction amount exceed this lower limit [70] it should be stopped all the time there is no notification [42] announcing the customer intentions [63] to pay or withdraw monies from given account from a remote location (respecting to the account manager [68]).

In order to further clarify this case lets take as example the case of the remote conventional transaction represented by the use of an ATM machine by a customer [5] in order to extract money from the account [4] managed by the bank [68].

Let assume that during the enrollment procedure the given customer have set up his Personal Security Policy [69] which is a set of instruction establishing when the bank [68] should check if it has received a notification [42] as a necessary step to enable the completion of a transaction. I.e.: No on-line (e-commerce) transaction higher than $50.00 (lower limit for triggering the PAN [70]) with my CC should be enabled, without having received the notification [42], announcing my intentions [63].

FIG. 13 illustrates a flow diagram describing the PAN's enrollment.

As we said above the method [106] presented here is not disruptive, i.e.: it will not change anything substantial in the way to accomplish the given remote transaction, but will add to the present-in-use procedure a Pre-Authorization Notification [65] step. (PAN step).

Therefore, for this particular ATM case of the example, the procedure will be as follows: before the customer accomplishes the withdrawing of the money from the ATM machine as usual, he picks-up his cell-phone [1] and selects the PAN's cell-phone application [67], which was previously installed in his cell-phone [1]. Once [67] is activated the purchaser enters the PIN and the PAN application [67] will offer a menu of possible remote transactions.

For this case the customer selects the ATM icon.

The application [67] will ask the customer to enter the upper limit of the transaction's amount [15] (i.e.: $100). Once entered, the application [67] will compute a time stamped digital signature [24] over the amount and the type of transaction, ATM in this case. The application [67] will also encode the digital signature to sound [22] and will place a call to the IVR [9] system working in conjunction with a Server [8].

As before, the IVR [9] will decode the acoustic digital signature [22], into a digital signature [24].

The Server [8], located at the account manager facilities, will receive the digital signature [24] from the IVR [9], will check the validity of such digital signature, and, eventually, if everything is right, will prepare a digitally-signed-by-the-Server document [42] stating the verified-by-the-server customer's willing to accomplish an ATM transaction up to the upper limit within a short period of time. Let's refer to this digitally-signed-by-the-Server document as a Digital Testimony [32], which is one type of notification [42]. Now the server [8] will transmit the Digital Testimony [32] to the account manager [68] (the customer's bank mainframe, the CC issuer platform, etc).

The customer [5] proceeds with the remote transaction [66] as usual. In this case (ATM), he introduces his plastic CC in the ATM, he keys in his PIN, etc, and he follows exactly the procedure as today.

On of the steps of this procedure includes the usual transaction's request for approval, which the ATM transmits to the account manager system (i.e.: the bank). Once such transaction's request for approval reaches the account manager system, the account manager system will proceed as today plus certain additional steps due to the method [106] of this invention. These additional steps includes the verification if the customer [5] who intent to do the transaction [66] is a PAN's participant customer, and if positive, the checking if, for such type of transaction, in this case ATM, the customer have requested the pre-notification step.

In the positive case, the account management [68] system will verify if the transaction amount is above the lower limit [70] for triggering the pre-notification requisite. Assuming that this is the case, the account management system will check if it has received a pre-authorization notification [42]

corresponding to the customer, and type of transaction. Again, assuming that this is the case, the account management system should check that the transaction amount coming with the standard transaction approval request is equal or lower than the amount specified in the pre-authorization notification. Only if positive, the account management system will enable the transaction approval procedure to continue. Otherwise, it will stop the transaction approval procedure or, alternatively, request additional steps in order to avoid a potential identity theft.

FIGS. 14 and 16 illustrate a flow diagram for the operation of Non-Disruptive PAN [106].

While the above mentioned example refers to ATM remote transaction, the PAN method is also good for several type of remote transaction like a check based transactions, fax based transactions, banking through the internet, banking over-the-phone, CC or debit card based transactions, and in general all the related to the account transactions whereas the customer identity and willing cannot be verified by the account manager staff. In very simple metaphorical words, the method [106] is like the faucet (the account) which is always closed, with the exemption of the short window of time after the account manager receives the notification to open or unfreeze it for one particular type of transaction, a window of time and up to one particular limit. And where such notification is based in a customer well verified digital signature [24].

Let's take now the example of a CC based on-line transaction [71] whereas the on-line merchant [72] is a non-participant on-line merchant [72], i.e.: a merchant which doesn't know about the existent of the PAN method.

The customer [75] will buy at such merchant site [73] as today, no procedure change, but before completing the transaction [71], if the type and amount of the transaction fell within the category of restricted transactions as per the agreement [69] between the customer [75] and the account manager [68], thus the customer [75] will add to the present-in-use procedure a pre-authorization notification step. (PAN step).

The additional step as per this method [106] consists of, before the customer [75] accomplishes the transaction [71] as usual, he picks-up his cell-phone [1] and selects the PAN application [67], which was previously installed in his cell-phone [1] during the enrollment procedure. Once activated the PAN application [67] will offer a menu of possible remote transactions [66].

For this case the customer [75] selects the "CC on-line" icon.

The application will ask the customer [75] to enter the upper limit [74] of the transaction's amount (i.e.: 150). Once entered, the application will compute a time stamped digital signature over the amount and the type of transaction [24], CC on-line in this case.

The application [68] will place a call to the IVR [9] system working in conjunction with a Server [8] and will also encode the digital signature to sound [22]. This Server [8], located at the account manager [68] (i.e.: the CC or Debit card issuer, the bank) facilities, will receive the digital signature [24], will check the validity of such digital signature [24], and, eventually, if everything is right, will prepare a digitally-signed-by-the-Server document [42] stating the verified-by-the-server customer's willing [63] to accomplish an CC transaction [71] up to the upper limit [74] within a short period of time. Let's refer to this digitally-signed-by-the-Server document as a Digital Testimony [32]. Now the server [8] will transmit the Digital Testimony [32] to the account manager [68] (the customer's bank mainframe, the CC issuer platform, etc).

The customer [75] proceeds with the remote transaction as usual.

The usual procedure includes the transaction's request for approval, ultimately, from the account management entity [68]. The merchant POS transmits to the account manager [68] system such request. Once such transaction's request for approval reaches the account manager [68] system (The Bank, The CC Issuer), the account manager [68] system will proceed as today plus certain additional steps due to the method of this invention [106].

These additional steps includes the checking if the customer's account, the account relevant for the transaction, is a PAN's participant customer account and, if positive, the checking if for such type of transaction [71], in this case CC on-line transaction [71], and for such transaction amount the customer [75] has instructed the account manager [68] that it is required the corroboration that the account manager system has in his possession the respective pre-authorization notification [42] or in the form of a Digital Testimony [32], or the like, notifying the account management [68] of the customer's willingness [63] to pursue with such transaction [71].

In the negative case, i.e.: if the account management system has no the expected Digital Testimony [32] or other notification [42], the account management [68] system is expected to reject the transaction [71] or alternatively to suspend the progress of the transaction approval and/or to contact the customer for verification of his identity and his willing to do the transaction.

It is worth to note that the PAN method [106] working in conjunction with the client software (the purchaser cell-phone application [67]) and the Server [8]-IVR [9] software of this invention is able to improve fundamentally the security of the remote transactions [66], maintaining "the faucet" (the customer's account) close all the time there is no a Time-Stamped Digital Signature [24] on the type of transaction and the upper limit of the transaction amount, perfectly validated by the Server [8].

In this way, it is possible:
- to overcome the security problems of the ATM transactions without the cooperation of the ATM owners,
- to overcome the security problems of the CC on-line transactions without the cooperation of the on-line merchants, nor the need to joint forces with the CC companies
- to overcome the security problems of the CC on-the-spot transactions without the cooperation of the acquirers, nor the issuers nor the POS owners
- to overcome the security problems of the checks without the need to change nothing in the traditional clearing procedure
- to overcome the security problems of the on-line-banking without the need of a secure computer,
- to overcome the security problems of the phone-banking without the cooperation of the over-the-phone merchants (i.e.; the customer can send his pre-authorization to the bank though any on-line PC while calling the over-the-phone merchant), Further the PAN method [106] is not weighty and complicated for the customer but fully optional i.e.: if the customer feels happy with the situation today (the faucet is open all the time) it is fine, he has been warned and offered a security improvement and the customer has rejected it. The bank/ Issuer position is better in any case due to the bank has suggested a solution. There will be many customers that will prefer to put a ceiling, and lower limit [70], which trigger the notification request on the remote transactions. For transaction amounts higher than that lower limit [70], it is foresee that they will request the PAN method (i.e.: ATM transaction higher than $3,000; a check of $5000 or higher, an on-line banking transaction of $1000 or higher; an e-commerce transaction higher than $100) All these rules are referred collectively as Personal Security Policy [69]

In other words any bank customer, when offered the PAN [106] solution, can specify his personal security policy [69], because, including the total rejection of the PAN is a way to state one particular security policy [69]

By last it is worth to note one of the problems of the remote transactions is the potential repudiation of a given transaction by the true account owner, in spite that the said account owner has, in fact, made the said transaction.

The PAN method delivers a Digital Testimony based in the customer digital signature which is un-repudiable.

Case Oral Means:

It is a further objective of this invention to present a method [107] for payments whereas the customer [80] is equipped with a portable device [93] able to store and, eventually, able to transmit, by means of any given technology (i.e.: Bluetooth, infrared, Wi-Fi, etc, the transmission technology [81]), a specially modified X.509 certificate [82].

This specially modified X.509 certificate [82] is the result of the encoding to bits of an assertion [83] stating, amongst other things, that one precise (and included in the assertion) CC account [84] belongs to a given person (name, address) which is the "owner [85]" of a given voiceprint [86](also included in the statement [83]) and whereas this voiceprint [86] was created by means of a given "speaker identification" technology [87] at certain agreed upon conditions [88](i.e.: noise background).

Additionally, the said declaration [83] must be digitally signed [90] by a Trusted Third Party [89] (i.e.: a Certification Authority, CA).

In more simple words, the modified X.509 of this invention [82] is a digitally signed document [90] associating a given CC account [84] with a given voiceprint [86], and due to the digital signature [90], this link become unmalleable, and impossible to corrupt due to the fact that the HASH value of the assertion [83] will change if the statement [83] is corrupted and this change is easily detected.

The payment method [107] presented here consists of, as said above, a portable device [93] in the hands of the customer [80] and a special POS [91] referred as BIO-POS in the store or in the hands of the seller [92], whereas the method [107] may work as follows: once the customer [80] decides to charge his CC or debit card account [84], buying a good or service, he launches the portable device causing it to transmit the X.509[82] to the Bio-POS [91].

This modified X.509[82] is transmitted by the portable device [93], to and captured by the special device of this invention, referred as "bio POS" [91], located at the store.

This device [91] will be ready to capture also the voice of the customer [80] (i.e.: the customer says: I would like to pay $55 charging my "CC account [84]" [97]) and, the bio-POS [91], using one agreed upon speech recognition technology [94], in conjunction with the technology of "speaker identification" [87] used to create the modified X.509 voiceprint, will:

1. Recognize the customer's words [95,97](using speech recognition technology 94])

2. analyze the customer voice [95] in order to determine the customer's voiceprint (the computed voiceprint [96])

3. check the Trusted Third Party's [89] digital signature [90] on the special X.509 [82] and eventually, if OK 4. extract the signed voiceprint [86] within the X.509[82], 5. compare the 2 voiceprints (computed [96] and extracted [86]) if they are similar within tolerances, and eventually if OK 6. extract the customer's [80] signed identity (i.e., name, address) within the X.509[82] together with the CC data [84]

7. and display the customer's name and the words uttered by the customer [97] for confirmation and eventually, if everything is OK 8. compare the transaction amount determined by the seller or the seller's system with the one determined by the customer's words [95] and if both are identical 9. charge the cc account [84], acting as a conventional POS [11] for the amount stipulated by the customer's [80] words [95]

Therefore by means of this method and devices [107, 91, and 93] the customer [80] can charge his CC account [84] paying without any other means than the portable device [93] which carries and transmits the special X.509[82] and by using his verbal commands [i.e. 95]. No other person can charge such account because such person voice [95] will be, in principle, different to the voice of the true owner [85], and consequently the computed voiceprint [96] will be different of the signed one [86], and the Bio POS [91] will reject the transaction.

No-Gadget Payment Method.

It is an additional objective of this invention to present a payment method [108] by which the customer [80] doesn't need to bring or carry any portable device [93] nor any material gadget in order to charge his CC account [84].

According to this method, there is a special X.509 Repository/or data base [98], which stores all the special X.509 certificates [82], whereas each one of the special X.509 [82] is as described above.

According to the method presented here [108] the above described BIO POS [91] is connected to the said repository [98], in a way that the Bio POS [91] can retrieve a copy of any desired special X.509[82].

Table of Additional Elements used by Method No-Gadgets Payment Systems [108]

1. Specially modified X.509 certificate [82] for each participant customer [80]

2. A POS [91] with special features referred as BIO-POS [91]

3. Repository of X.509 certificates [98]

This payment method [108], presented here may work as follows:

FIG. 16 illustrates a flow diagram for enrollment for method 108

Once the customer [80] has decided to charge his CC account [84] with a given amount in order to complete a transaction, he let the Bio POS [91] know who he [80] pretend to be, i.e.: by speaking out his name, or his Identification number (i.e.: Social security number), or by entering his name into a Bio POS [91] keypad, or entering his ID number, or by any other method resulting in enabling the Bio POS [91] to know who this customer [80] pretend to be and more, which special X.509[82] correspond to him, in order to retrieve it [82] from the said repository [98].

Once the Bio POS [91] has retrieved the special X.509[82] of the person who the customer pretend to be, this Bio POS [91] will be ready to capture also the voice of the customer (i.e.: the customer says: I would like to pay $55 with my account [95]) and, by means of the technology of "speaker identification" [87] used to create the modified X.509 [82] voiceprint [86], using in conjunction a given speech recognition technology [94], agreed upon in advance or established within the special X.509[82], this "Bio POS" [91] will:

1. Recognize the customer's words [95] (using speech recognition technology [94]).

2. analyze the customer voice [95] in order to determine the customer's voiceprint (the computed voiceprint [96])

3. check the Trusted Third Party's [89] digital signature [90] on the special X.509 [82] and eventually, if OK 4. extract the signed voiceprint [86] within the X.509 [82], 5. compare the 2 voiceprints (computed [96] and extracted [86]) if they are similar within tolerances, and eventually if OK 6. extract the customer's [80] signed identity (i.e., name, address) within the X.509 [82] together with the CC data [84]

7. and display the customer's name and the words uttered by the customer [97] for confirmation and eventually, if everything is OK 8. compare the transaction amount determined by the seller or the seller's system with the one determined by the customer's words [95] and if both are identical 9. charge the cc account [84], acting as a conventional POS [11] for the amount stipulated by the customer's [80] words [95] printing an slip to be signed as usual by the customer [80]

FIGS. 17 and 18 illustrate a flow diagram for method [108] operation

Some of the methods of payments described in this invention may enjoy the "anti-phishing" features, as described in the U.S. Pat. No. 6,957,185, whereas the server [80], after receiving the customer digital signature [24], authenticates itself in front of the customer [5] and/or the seller [10], generating and transmitting a variable and specific code, referred as Reverse OTP different for each transaction (i.e.: each received digital signature [24]) and whereas the server [8] transmits the variable codes to the seller [10], the seller's transaction specific code or seller's reverse OTP, and through the seller [10] to the customer [5], the customer's transaction specific code respectively, and whereas each of them, or one of them, compares the received variable code with the one their respective cellular phone application [17] of this invention displays.

In the case the customer [5] compares the received variable code, received after sending the digital signature [24] on the type of transaction and amount, and find out that such one time code, received though the seller [10] or directly, is identical to the one displayed in his cell-phone display, he can rest sure that he is dealing with his true service provider and not with a phished service. The same can be said for the seller.

It is practically impossible for a phisher or for a phished server to guess the number the purchaser' cell-phone application will display after sending the digital signature. Only the CSS [8] knows how to compute this one time code.

While we have presented several payment methods, it should be clear that combinations of such methods are also presented. I.e.: The method Adaptor [102] combined with the method No-Gadget payment method [108] makes a powerful payment method [109]. According to this method [109] instead of the Bio-POS [91] it is presented an up-graded [44b] Adaptor [44] with the additional features of the Bio-POS [91], with the exception of the conventional POS features.

This combined method [109] enables the use of a no-gadget payment method without the need to replace or update the present-in-use POS.

The method [109] is described as follows:

Once the customer [80] has decided to charge his CC account [84] with a given amount in order to complete a transaction, he [80] lets the Adaptor [44b] know who he [80] pretend to be, i.e.: by speaking out his name, or his Identification number (i.e.: Social security number), or by entering his name into a Adaptor [44b] keypad, or entering his ID number, or by any other method resulting in enabling the Adaptor [44b] to know who this customer [80] pretend to be and more, which special X.509[82] correspond to him, in order to retrieve it [82] from the repository [98].

Once the Bio Adaptor [44b] has retrieved the special X.509 [82] of the person who the customer pretend to be, this Adaptor [44b] will be, ready to capture also the voice of the customer (i.e.: the customer says: I would like to pay $55 with my CC account" [95]) and, by means of the technology of "speaker identification" [87] used to create the modified X.509[82] voiceprint [86], and using in conjunction a given speech recognition technology [94], agreed upon in advance or established within the special X.509[82], this Adaptor [44b] will:

1. Recognize the customer's words [95](using speech recognition technology [94]) and record it as a testimony 2. analyze the customer voice [95] in order to determine the customer's voiceprint (the computed voiceprint [96])

3. check the Trusted Third Party's [89] digital signature [90] on the special X.509 [82] and eventually, if OK 4. extract the signed voiceprint [86] within the X.509[82], 5. compare the 2 voiceprints (computed [96] and extracted [86]) if they are similar within tolerances, and eventually if OK 6. extract the customer's [80] signed identity (i.e., name, address) within the X.509[82] together with the CC data [84]

7. and display the customer's name and the words uttered by the customer [97] for confirmation and eventually, if everything is OK 8. compare the transaction amount determined by the seller or the seller's system with the one determined by the customer's words [95] and if both are identical 9. The Adaptor [44b], according with a configuration of this method [109] transmits to the Issuer [37] the transaction data for notification [42] of the willing [63] of the purchaser to execute the referred transaction 10. The adaptor [44b]: writes on a temporarily card's magnetic Stripe the Customer credit card data [84] creating a "clone" card [41] which is ejected from the adaptor [44b], handed by the seller, and swiped in the conventional POS [11] magnetic card reader.

11. The POS [11] reads the Customer's credit card data [4] and completes the transaction as usual. The "clone" card [41] is returned to adaptor [44b] to be erased.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. The scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described exemplary embodiments that are known to those of ordinary skill in the art are expressly incorporated herein by reference and are intended to be encompassed by the present claims.

The invention claimed is:

1. A method for making a payment for a financial transaction utilizing a portable device, comprising the steps of:
selecting a software application stored on the portable device;
entering a personal identification number;
entering an amount for the financial transaction;
generating an acoustic signal, wherein the acoustic signal includes a purchaser digital signature;
generating, by a speaker of the portable device, the acoustic signal;
receiving, by a microphone of a seller portable device, the acoustic signal; and
transmitting the acoustic signal decoded to a central server.

* * * * *